(12) United States Patent
Kawakami

(10) Patent No.: US 12,469,286 B2
(45) Date of Patent: Nov. 11, 2025

(54) INFORMATION PROCESSING APPARATUS, INFORMATION PROCESSING METHOD, AND PROGRAM

(71) Applicant: NEC Corporation, Tokyo (JP)

(72) Inventor: Kazuya Kawakami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 162 days.

(21) Appl. No.: 18/271,379

(22) PCT Filed: Jan. 15, 2021

(86) PCT No.: PCT/JP2021/001324
§ 371 (c)(1),
(2) Date: Jul. 7, 2023

(87) PCT Pub. No.: WO2022/153496
PCT Pub. Date: Jul. 21, 2022

(65) Prior Publication Data
US 2024/0303985 A1    Sep. 12, 2024

(51) Int. Cl.
*G06V 10/44* (2022.01)
*G06T 7/20* (2017.01)
(Continued)

(52) U.S. Cl.
CPC ............ *G06V 20/44* (2022.01); *G06T 7/20* (2013.01); *G06T 7/70* (2017.01); *G06V 10/25* (2022.01);
(Continued)

(58) Field of Classification Search
CPC .......... H04N 7/18; G06V 10/44; G06V 20/52; G06V 40/20; G06T 7/70; G06V 10/25;
(Continued)

(56) References Cited

U.S. PATENT DOCUMENTS

2017/0046574 A1*  2/2017  Laska ............... G06F 3/04842
2018/0362028 A1* 12/2018  Prokhorov ......... B62D 15/0255
(Continued)

FOREIGN PATENT DOCUMENTS

CN         111856399 A      10/2020
JP         2006-060328 A     3/2006
(Continued)

OTHER PUBLICATIONS

JP Office Action for JP Application No. 2022-575001, mailed on Feb. 6, 2024 with English Translation.
(Continued)

*Primary Examiner* — Tsion B Owens

(57) ABSTRACT

An information processing apparatus includes a movement history generating unit that generates feature information determining a moving body being present in a target area, and position information at that time, by processing an image, also generates movement history information, of the moving body, associating the feature information and the position information with time information, and stores the generated information in a related party database, an event determining unit that detects occurrence of an event, by analyzing a sound being associated with position information and time information, and determines an occurrence location and time of the event, and an extracting unit that extracts feature information of a related moving body being at least one of the moving body related to the event, and the moving body being present at a location from which the event is witnessable, by searching the related party database by using the determined occurrence location and time.

18 Claims, 13 Drawing Sheets

(51) Int. Cl.
  *G06T 7/70* (2017.01)
  *G06V 10/25* (2022.01)
  *G06V 20/40* (2022.01)

(52) U.S. Cl.
  CPC .... *G06V 10/44* (2022.01); *G06T 2207/30196* (2013.01)

(58) Field of Classification Search
  CPC ........... G06V 20/44; G06T 7/20; G06T 7/246; G06T 2207/30232; G06T 2207/30196; G06T 2207/30241
  See application file for complete search history.

(56) References Cited

U.S. PATENT DOCUMENTS

| | | | |
|---|---|---|---|
| 2019/0259259 A1 | 8/2019 | Mullins | |
| 2019/0306453 A1* | 10/2019 | Tatsuta | G10L 25/57 |
| 2019/0332855 A1* | 10/2019 | Taniguchi | G06V 40/70 |
| 2021/0122373 A1* | 4/2021 | Dax | B60W 30/18159 |
| 2023/0336694 A1* | 10/2023 | Wexler | G10L 25/63 |

FOREIGN PATENT DOCUMENTS

| | | | |
|---|---|---|---|
| JP | 2007264950 A | * | 10/2007 |
| JP | 2009-105612 A | | 5/2009 |
| JP | 2011-120022 A | | 6/2011 |
| JP | 2017-107583 A | | 6/2017 |
| JP | 2017-117005 A | | 6/2017 |
| JP | 2018101916 A | * | 6/2018 |
| JP | 2018-151963 A | | 9/2018 |
| JP | 2019-004373 A | | 1/2019 |
| JP | 2019-192969 A | | 10/2019 |
| WO | 2018/138834 A1 | | 8/2018 |

OTHER PUBLICATIONS

International Search Report for PCT Application No. PCT/JP2021/001324, mailed on Apr. 13, 2021.

JP Office Action for JP Application No. 2024-118621, mailed on Jun. 17, 2025 with English Translation.

JP Office Action for JP Application No. 2024-118621, mailed on Apr. 1, 2025 with English Translation.

* cited by examiner

INFORMATION PROCESSING APPARATUS, INFORMATION PROCESSING METHOD, AND PROGRAM

This application is a National Stage Entry of PCT/JP2021/001324 filed on Jan. 15, 2021, the contents of all of which are incorporated herein by reference, in their entirety.

TECHNICAL FIELD

The present invention relates to an information processing apparatus, an information processing method, and a program, and, particularly, relates to an information processing apparatus, an information processing method, and a program of a surveillance system.

BACKGROUND ART

Patent Document 1 describes a surveillance system that performs recording of imaging data of a surveillance target in response to an abnormal sound such as destruction of an image capturing target. Patent Document 2 describes a video information sharing system that inputs video information of a predetermined area, saves the input video information in a temporary memory for a predetermined period, accepts, when an event occurs, input of event information including a time of the event, takes out video information from the temporary memory in a period before and after the time, stores the taken video information in a storage memory, and thereby makes it easy to acquire video information being related to the event.

RELATED DOCUMENTS

Patent Documents

Patent Document 1: Japanese Patent Application Publication No. 2006-60328
Patent Document 2: Japanese Patent Application Publication No. 2019-4373

SUMMARY OF INVENTION

Technical Problem

In recent years, a surveillance camera has increased in a town and around a building, but, meanwhile, a crime or the like often occurs in a place without a surveillance camera, and therefore, it is desired to resolve a crime in such a place at an early stage.

The present invention has been made in view of the above circumstances, and an object thereof is to detect occurrence of an event at an early stage regardless of presence or absence of a surveillance camera, and to search for a moving body including a person being related to the event.

Solution to Problem

In each aspect of the present invention, each of the following configurations is adopted in order to solve the above-mentioned problem.

A first aspect relates to an information processing apparatus.

The information processing apparatus according to the first aspect includes:

a movement history generating unit that generates feature information determining a moving body being present in a target area, and position information at that time, by processing an image, also generates movement history information, of the moving body, associating the feature information and the position information with time information, and stores the generated information in a related party database;

an event determining unit that detects occurrence of an event, by analyzing a sound being associated with position information and time information, and determining an occurrence location and a time of the event; and an extracting unit that extracts feature information of a related moving body being at least one of the moving body being related to the event, and the moving body being present at a location from which the event is witnessable, by searching the related party database by using the occurrence location and time determined by the event determining unit.

A second aspect relates to an information processing method executed by at least one computer.

The information processing method according to the second aspect includes, by an information processing apparatus:

generating feature information determining a moving body being present in a target area, and position information at that time, by processing an image, also generating movement history information, of the moving body, associating the feature information and the position information with time information, and storing the generated information in a related party database;

detecting occurrence of an event, by analyzing a sound being associated with position information and time information, and determining an occurrence location and a time of the event; and extracting feature information of a related moving body being at least one of the moving body being related to the event, and the moving body being present at a location from which the event is witnessable, by searching the related party database by using the determined occurrence location and time.

Note that, another aspect of the present invention may be a program causing at least one computer to execute the method according to the second aspect, or may be a storage medium being readable by a computer storing such a program. The storage medium includes a non-transitory tangible medium.

The computer program includes a computer program code causing, when executed by a computer, the computer to implement the information processing method on an information processing apparatus.

Note that, any combination of the above components and a conversion of an expression of the present invention among a method, an apparatus, a system, a storage medium, a computer program, and the like are also effective as an aspect of the present invention.

Moreover, various components according to the present invention do not necessarily need to be independent of each other, and may be in such a way that a plurality of components are formed as one member, one component is formed of a plurality of members, a certain component is a part of another component, a part of a certain component and a part of another component overlap with each other, or the like.

Moreover, although the method and the computer program according to the present invention describe a plurality of procedures in order, the order of description does not limit an order in which the plurality of procedures are executed. Thus, when implementing the method and computer program according to the present invention, the order of the plurality of procedures can be changed within a scope that does not cause inconvenience in terms of content.

Furthermore, the plurality of procedures of the method and the computer program according to the present invention are not limited to being executed at timings different from each other. Thus, there may be a case that, during execution of a certain procedure, another procedure occurs, a case that an execution timing of a certain procedure and an execution timing of another procedure partly or entirely overlap each other, or the like.

Advantageous Effects of Invention

According to each of the above aspects, a technique for sensing occurrence of an event at an early stage regardless of presence or absence of a surveillance camera, and searching for a moving body including a person being related to the event can be provided.

EXAMPLE EMBODIMENT

Hereinafter, example embodiments of the present invention are described by using the drawings. Note that, in all of the drawings, a similar component is assigned with a similar reference sign, and description thereof is not included as appropriate. Moreover, in each of the following figures, a configuration of a portion that does not concern essence of the present invention is not included, and is not illustrated.

In the example embodiment, "acquisition" includes at least one of fetching, by a local apparatus, data or information stored in another apparatus or a storage medium (active acquisition), and inputting, into a local apparatus, data or information output from another apparatus (passive acquisition). Examples of active acquisition include requesting or inquiring of the another apparatus and receiving a reply thereof, accessing the another apparatus or the storage medium and reading, and the like. Moreover, an example of passive acquisition includes receiving information given by distribution (or transmission, push notification, or the like), and the like. Further, "acquisition" may include selecting and acquiring from received data or information, or selecting and receiving distributed data or information.

First Example Embodiment

<System Outline>

Figure 1:
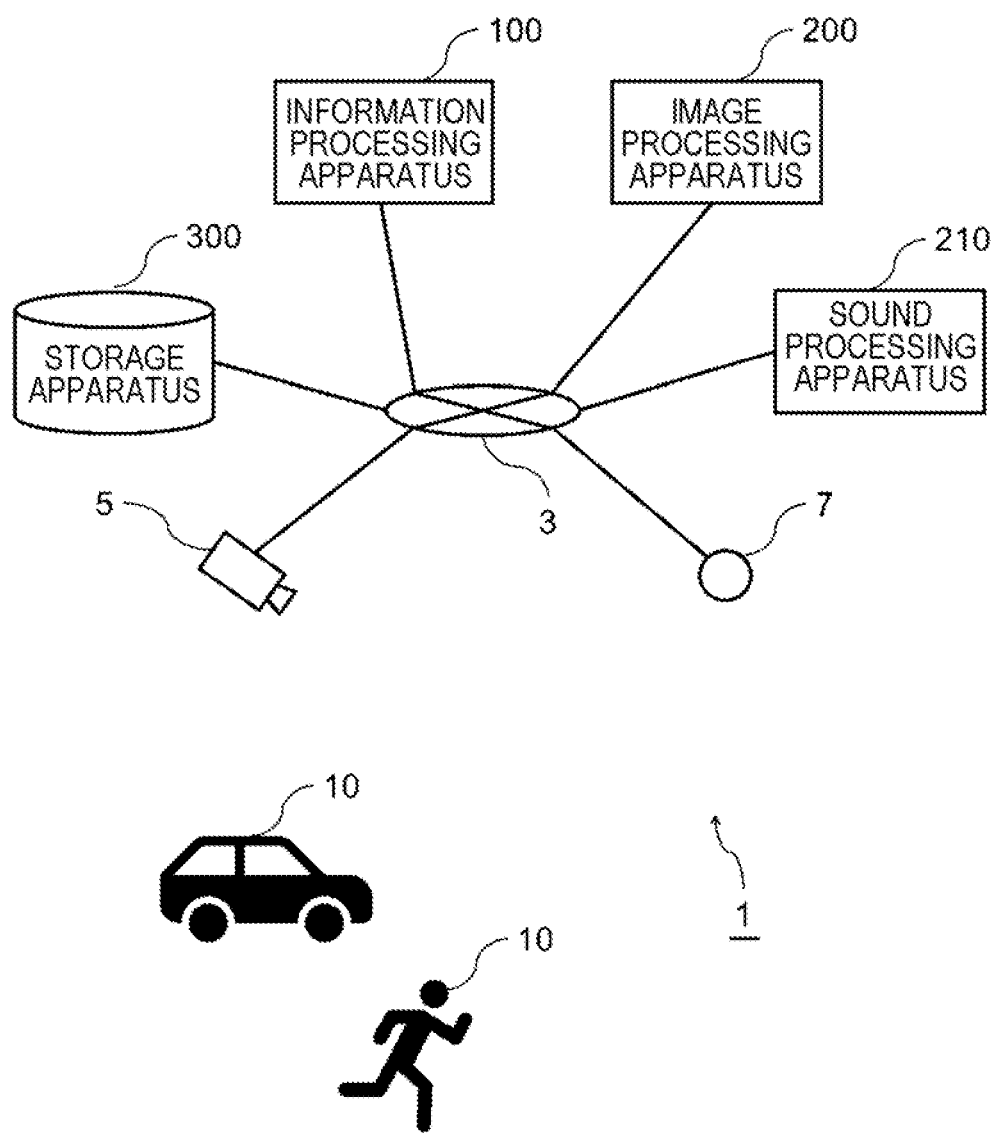
FIG. 1 It is a diagram schematically illustrating an outline of a surveillance system according to an example embodiment.

FIG. 1 is a diagram schematically illustrating an outline of a surveillance system 1 according to an example embodiment. The surveillance system 1 includes an information processing apparatus 100, an image processing apparatus 200, a sound processing apparatus 210, at least one camera 5, and at least one microphone 7. Further, the surveillance system 1 includes a storage apparatus 300.

The camera 5 may be specialized for the surveillance system 1, or may utilize, for example, a camera that has been installed before. Alternatively, the camera 5 may be an in-vehicle camera. The camera 5 may be installed in various places such as a street, inside of a facility, and inside of a building. The microphone 7 may be installed in various places such as a street, inside of a facility, and inside of a building, separately from the camera 5. The microphone 7 may be a microphone mounted on the camera 5. The microphone 7 may be installed in more places than the camera 5. In particular, the microphone 7 may be installed in an inconspicuous place.

Further, the surveillance system 1 may further include a sensor (not illustrated) such as an odor sensor that senses an odor, a temperature sensor, a smoke detector, a gas leak sensor, or a sensor that senses pressing of a notification button. The sensor is not limited thereto, and a sensor acquiring information that can be used for determining an event to be a sensing target can be used.

The storage apparatus 300 may be an apparatus included inside at least one of the information processing apparatus 100 and the image processing apparatus 200, may be an apparatus separate from the information processing apparatus 100 and the image processing apparatus 200, or may be a combination thereof.

The camera 5 generates a captured image. The camera 5 includes a lens and an image sensor element such as a charge coupled device (CCD) image sensor. The camera 5 may include a mechanism that performs control of orientation of a camera body and a lens, zoom control, focusing, and the like following a movement of a person entering an angle of view.

Since the camera 5 may not be specialized for the surveillance system 1, an image capturing range and an image capturing time are not particularly limited. However, the camera 5 may capture a range in which an image of a related moving body is capturable. Further, the camera 5 may set, as an image capturing time, a date and time or a period when there is a high possibility that a related moving body is present.

For example, the camera 5 may capture an image of a range including a place where a related moving body is scheduled to visit, on a date and time or in a period when the related moving body is scheduled to visit. Alternatively, the camera 5 may capture an image of a range including a street, a road, a passage, a vacant lot, a back alley, inside of a building or a site of a store, a facility, or the like, a specific floor inside a building, a place around a cash register of a store, and the like, in a time period and an area (e.g., an unfrequented place, an insecure area, a tourist resort, and the like) in which a crime frequently occurs. Alternatively, at a site of an event, a festival, or the like being crowded with people, the number of the cameras 5, an image capturing spot, an image capturing range, and the like may be changed according to a date and time when the event, the festival, or the like is held.

An image generated by the camera 5 is transmitted to the information processing apparatus 100 or the image processing apparatus 200 via a communication network 3. The image may be transmitted from the camera 5 to the information processing apparatus 100 and transmitted from the information processing apparatus 100 to the image processing apparatus 200 for image processing, the image may be transmitted from the camera 5 to the image processing apparatus 200 and a result of image processing may be transmitted from the image processing apparatus 200 to the information processing apparatus 100, or a combination of the transmission may be performed.

A connection method between the camera 5 or the microphone 7, and the information processing apparatus 100 or the image processing apparatus 200 may be wireless or wired. In a case of wireless connection, it is assumed that the camera 5 or the microphone 7, the information processing apparatus 100, and the image processing apparatus 200 each have a wireless communication function. The camera 5 may be, for example, a network camera such as an Internet protocol (IP) camera.

A utilization method of an image generated by the camera 5 is (a1) generation of movement history information of a moving body 10 in a target area, (a2) estimation of a movement path of the moving body 10 after sensing of occurrence of an event, or the like.

For example, when an image is used in order to perform estimation of a movement path of the moving body 10 after sensing of occurrence of the event in (a2), it is preferable that the image is transmitted to the information processing apparatus 100 or the image processing apparatus 200 in real time. However, an image transmitted to the information processing apparatus 100 or the image processing apparatus 200 may not be immediately transmitted from the camera 5, and may be an image delayed by a predetermined time. An image generated by the camera 5 may be temporarily stored in a storage apparatus (may be the storage apparatus 300 or may be another storage apparatus (including a storage medium)), and the information processing apparatus 100 or the image processing apparatus 200 may read the stored image from the storage apparatus sequentially or at a predetermined interval. Further, an image transmitted to the information processing apparatus 100 or the image processing apparatus 200 is preferably a moving image, but may be a frame image at a predetermined interval, or may be a still image.

Further, a plurality of cameras 5 may be switched to each other and an image may be captured in such a way as to track a movement of the moving body 10 being related to the event. Alternatively, a movement of the moving body 10 being related to the event may be tracked by using images captured by the plurality of cameras 5.

On the other hand, when an image is used for generation of movement history information of the moving body 10 in a target area in (a1), the image may not be transmitted to the information processing apparatus 100 or the image processing apparatus 200 in real time, but may be temporarily stored in a storage apparatus (including a storage medium as well), then read from the storage apparatus by the information processing apparatus 100 or the image processing apparatus 200, and processed.

Hardware Configuration Example

Figure 2:
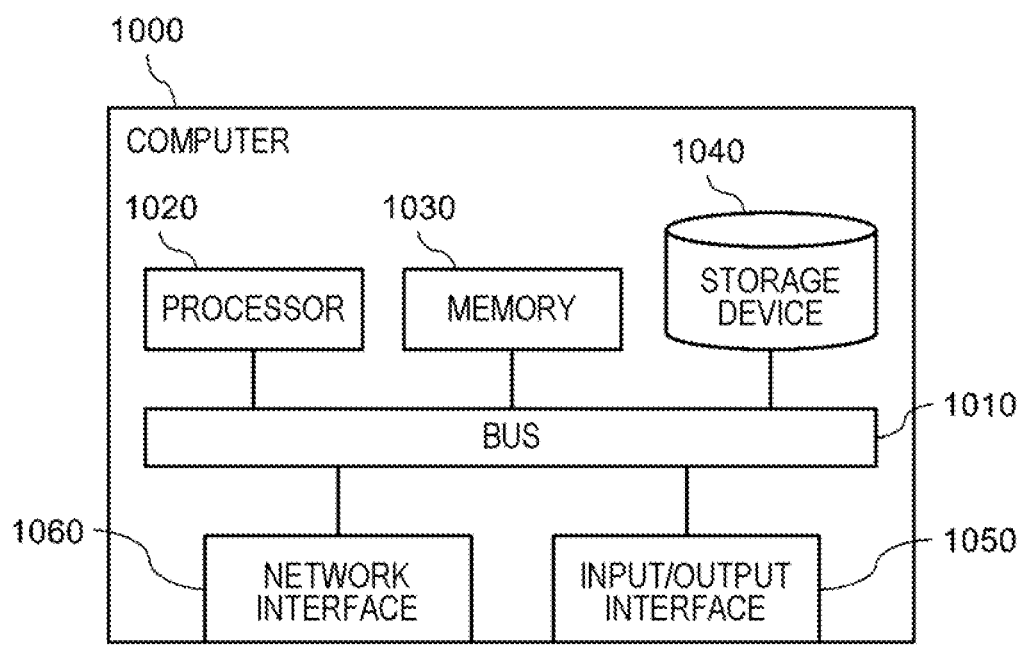
FIG. 2 It is a block diagram illustrating a hardware configuration of a computer that implements each of an information processing apparatus, an image processing apparatus, and a sound processing apparatus of the surveillance system illustrated in FIG. 1.

FIG. 2 is a block diagram illustrating a hardware configuration of a computer 1000 that implements each of the information processing apparatus 100, the image processing apparatus 200, and the sound processing apparatus 210 of the surveillance system 1 illustrated in FIG. 1.

The computer 1000 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor implemented by a central processing unit (CPU), a graphics processing unit (GPU), or the like.

The memory 1030 is a main storage apparatus implemented by a random access memory (RAM) or the like.

The storage device 1040 is an auxiliary storage apparatus implemented by a hard disk drive (HDD), a solid state drive (SSD), a memory card, a read only memory (ROM), or the like. The storage device 1040 stores a program module that implements each function (e.g., a movement history generating unit 102, an event determining unit 104, and an extracting unit 106 in FIG. 3 described later, a movement path generating unit 108 in FIG. 7, or the like) of the information processing apparatus 100 of the surveillance system 1. The processor 1020 reads each of the program modules onto the memory 1030, executes the read program module, and thereby implements each function being relevant to the program module. Moreover, the storage device 1040 also functions as a storage unit (not illustrated) that stores various pieces of information used by the information processing apparatus 100 or the image processing apparatus 200. Moreover, the storage apparatus 300 may also be implemented by the storage device 1040.

The program module may be stored in a storage medium. A storage medium storing the program module may include a non-transitory tangible medium usable by the computer 1000, and a program code readable by the computer 1000 (the processor 1020) may be embedded in the medium.

The input/output interface 1050 is an interface for connecting the computer 1000 to various kinds of input/output equipment.

The network interface 1060 is an interface for connecting the computer 1000 to the communication network 3. The communication network 3 is, for example, a local area network (LAN) or a wide area network (WAN). A method of connecting the network interface 1060 to the communication network 3 may be wireless connection, or may be wired connection. However, the network interface 1060 may not be used.

Then, the computer 1000 is connected to necessary equipment (e.g., the camera 5, the microphone 7, a sensor (not illustrated), a display (not illustrated), a speaker (not illustrated), or the like) via the input/output interface 1050 or the network interface 1060.

Since the surveillance system 1 is implemented by a combination of the information processing apparatus 100 and the image processing apparatus 200, the surveillance system 1 is implemented by a plurality of the computers 1000 constituting each of the apparatuses. The information processing apparatus 100 is, for example, a server computer or a personal computer. The image processing apparatus 200 may be an apparatus separate from the information processing apparatus 100, may be an apparatus included inside the information processing apparatus 100, or may be a combination thereof.

As described later, since clothes, a language, a vehicle to be utilized, and the like of a person being a moving body recognized for each area are different, a model being associated to clothes, a language, a vehicle, and the like to be recognized by the image processing apparatus 200 and the sound processing apparatus 210 may be prepared in advance for each area or language.

Each component of the information processing apparatus 100 according to the present example embodiment in FIG. 3 described later is implemented by any combination of hardware and software of the computer 1000 in FIG. 2. Then, it is understood by a person skilled in the art that there are various modified examples of the implementing methods and apparatuses. A functional block diagram illustrating the information processing apparatus 100 according to each example embodiment illustrates not a configuration on a hardware basis but a block of a logical function basis.

Functional Configuration Example

Figure 3:
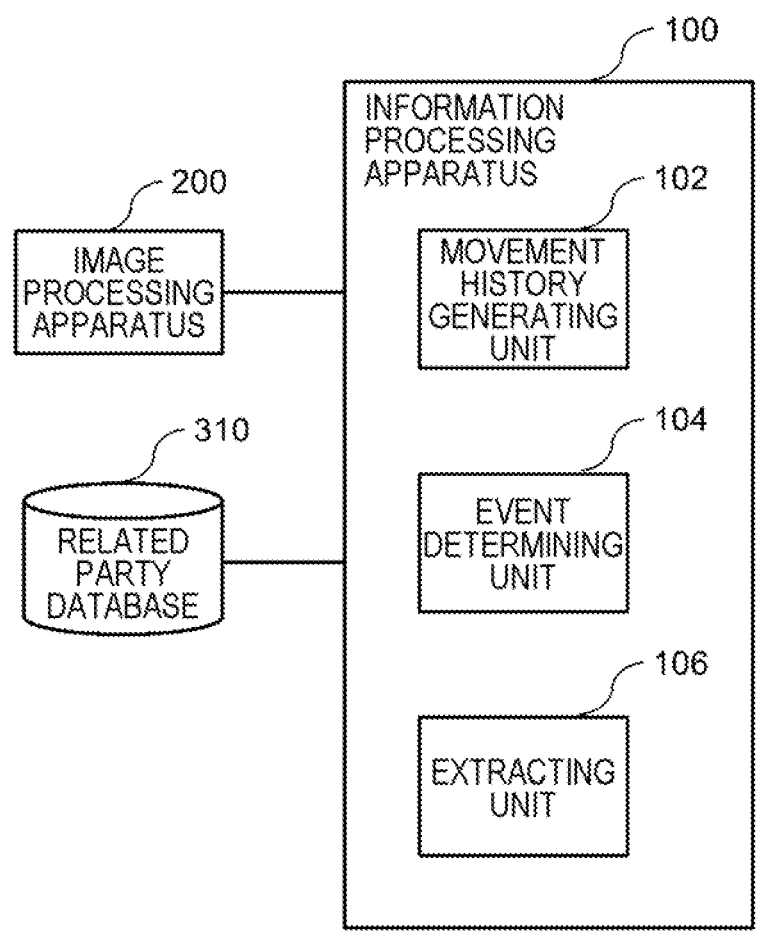
FIG. 3 It is a functional block diagram logically illustrating a configuration example of the information processing apparatus according to the example embodiment.

FIG. 3 is a functional block diagram logically illustrating a configuration example of the information processing apparatus 100 according to the present example embodiment. The information processing apparatus 100 includes the movement history generating unit 102, the event determining unit 104, and the extracting unit 106.

The movement history generating unit 102 generates feature information determining a moving body existing in a target area and position information at that time, by processes an image, also generates movement history information, of the moving body, associating the feature information and the position information with time information, and stores the generated information in a related party database 310.

The event determining unit 104 detects occurrence of an event, by analyzes a sound being associated with position information and time information, and determines an occurrence location and a time of the event.

The extracting unit 106 extracts feature information of a related moving body being at least one of the moving body being related to the event, and the moving body being present at a location from which the event is witnessable, by searching the related party database 310 by using the occurrence location and time determined by the event determining unit 104.

The target area is an area being a target for surveying a movement of a moving body, and at least one camera 5 and at least one microphone 7 are installed in the target area. The camera 5 determines at least a part of a region of the target area as an image capturing range. The microphone 7 collects a sound in at least a part of a region of the target area.

However, an image and a sound utilized by the information processing apparatus 100 may not be necessarily an image and a sound generated by the camera 5 and the microphone 7 installed in the target area. That is to say, there is no exclusion of using, by the information processing apparatus 100, an image generated by the camera 5 installed outside the target area or a sound collected by the microphone 7 installed outside the target area, instead of by the camera 5 or the microphone 7 installed in the target area.

The moving body 10 includes at least one of a person and a vehicle.

Feature information that determines the moving body 10 includes, for example, at least one of feature values such as a face, an iris, a vein, an auricle, a fingerprint, a gait, stature (a height, a shoulder width, a body size, a skeleton, or the like), and the like of a person. Further, feature information may include feature information indicating at least one of features such as clothes (a shape, a color, a material, or the like), a hairstyle (including a hair color), an ornament (a hat, glasses, an accessory, or the like), belonging (a bag, an umbrella, a cane, or the like), and the like. Furthermore, the moving body 10 may be a vehicle, and, therefore, may include feature information indicating a feature of a vehicle (e.g., a type of vehicle, a license plate, a vehicle model, a color of a vehicle body, or the like). Alternatively, among pieces of the feature information, feature information in which at least two pieces of the feature information are combined may be used. As described later, feature information that determines the moving body 10 may include feature information of a sound of the moving body 10, for example, a talking voice, a spoken word, a way of talking, a language, a dialect, breathing, a voiceprint, a cry, a footstep, a sound of dragging baggage, a sound of clothes and an ornament, a firing sound, an engine sound, a sound of a horn, a way of sounding a horn, an opening and closing sound of a door, and the like.

The related party database 310 is included in the storage apparatus 300. However, the storage apparatus 300 may be configured with a plurality of storage apparatuses as described above.

Figure 4:
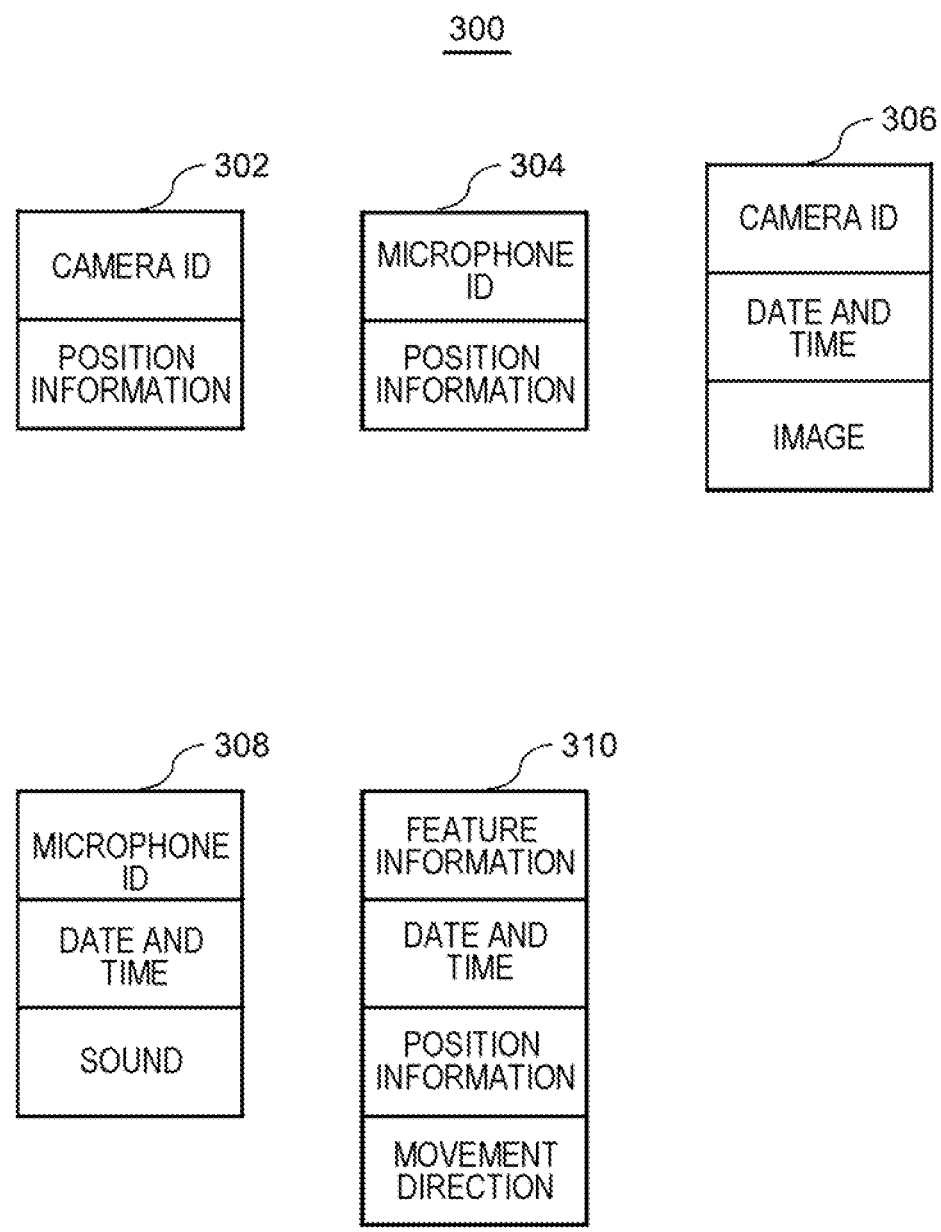
FIG. 4 It is a diagram illustrating a data structure example of various pieces of information stored in a storage apparatus.

FIG. 4 is a diagram illustrating a data structure example of various pieces of information stored in the storage apparatus 300. A camera table 302 associates position information of installation of the camera 5 with a camera ID being identification information determining the camera 5. Further, the camera table 302 may include an IP address of the camera 5. A microphone table 304 associates position information of installation of the microphone 7 with a microphone ID being identification information determining the microphone 7. Further, the microphone table 304 may include an IP address of the microphone 7.

Position information may be indicated by at least one of, for example, a latitude/longitude coordinate system, a plane rectangular coordinate system, a geodetic system, an address, and the like, or may be a combination of a plurality of pieces of information, and is not particularly limited.

An image storage unit 306 stores an image transmitted from the camera 5. The image storage unit 306 stores by associating a camera ID (or may be an IP address of the camera 5) of the camera 5 that has captured the image, with a reception date and time (however, not limited to a reception date and time, and may be, for example, an image capturing date and time, an image generating date and time, a storing date and time, or the like) of the image, and image data. Alternatively, image data may be stored by dividing a storage area (e.g., a directory or a folder) for each of the cameras 5 (or an installation area of the camera 5) or each date and time. Alternatively, a file name of the image data may include information (e.g., a camera ID or an IP address) that can determine the camera 5. In other words, as long as the image storage unit 306 stores image data in a state where it is recognized with which camera 5 and when the image data have been captured, a method of the storage is not particularly limited.

A sound storage unit 308 stores a sound transmitted from the microphone 7. The sound storage unit 308 stores by associating a microphone ID (or may be an IP address of the microphone 7) of the microphone 7 that has collected the sound, with a reception date and time (however, not limited to a reception date and time, and may be, for example, a sound collection date and time, a sound generating date and time, a recording date and time, or the like) of the sound, and sound data. Alternatively, sound data may be stored by dividing a storage area (e.g., a directory or a folder) for each of the microphones 7 (or an installation area of the microphone 7) or each date and time. Alternatively, a file name of the sound data may include information (e.g., a microphone ID or an IP address) that can determine the microphone 7. In other words, as long as the sound storage unit 308 stores sound data in a state where it is recognized with which microphone 7 and when the sound data have been collected, a method of the storage is not particularly limited.

Movement history information of the moving body 10 is stored in the related party database 310. In the movement history information, feature information of the moving body 10 recognized in an image is associated with position information of the moving body 10 and a date and time at a time point when the moving body 10 is captured in the image. The position information is computed based on installation position information of the camera 5 that has captured the image, information such as an image capturing direction and an image capturing range (angle of view) of the camera 5, and a position of the moving body 10 within the image. The position information of the moving body 10 may be indicated by, for example, at least one of a latitude/longitude coordinate system, a plane rectangular coordinate system, a geodetic system, an address, and the like, or may be a combination of a plurality of pieces of information, and is not particularly limited. A date and time are computed from information such as a time stamp of an image (or an image frame) in which the moving body 10 is captured.

Further, in the movement history information, a movement direction of the moving body 10 is associated with feature information of the moving body 10 recognized within the image. Alternatively, for example, in a case of the moving body 10 recognized within an image captured by a 360-degree camera or the camera 5 that can change an image capturing direction, the feature information may be further associated with information indicating an image capturing direction. Moreover, in the related party database 310, information (e.g., a file name (or a storage place) of image data, an image frame number, or the like) that can determine image data (frame) from which feature information stored in the movement history information is extracted may be further stored in association with feature information.

The movement history generating unit 102 analyzes, by using the image processing apparatus 200, an image captured with the camera 5 and stored in the image storage unit 306. However, the image may be an image received from the camera 5, and may not be stored in the image storage unit 306. For the moving body 10 recognized by the image processing apparatus 200, all persons and vehicles within an image may be determined as recognition targets, or a specific person or vehicle may be registered in advance and determined as a recognition target. The specific person is, for example, an important person, a foreigner, a tourist, or the like, and includes a person particularly needing guard. Further, the specific person may be a wanted person, a suspect, a person requiring attention, or the like, and may particularly include a person needing surveillance.

The event determining unit 104 analyzes, by using the sound processing apparatus 210, a sound collected by the microphone 7 and stored in the sound storage unit 308. However, the sound may be a sound received from the microphone 7, and may not be stored in the sound storage unit 308.

An event detected by the event determining unit 104 is, for example, a crime or an incident. An event is, for example, theft, robbery, pickpocketing, luggage lifting, shoplifting, a threat, a fight, violence, assault, injury or an injury case resulting in death, kidnapping, bombing, murder, an assailant, terrorism, barricading oneself, arson, a traffic accident (hit and run resulting in injury or death of a person, hit and run causing property damage, runaway, or the like), destruction of a structure (property destruction), or the like.

The event determining unit 104 detects occurrence of an event by recognizing a predetermined sound. For example, the event determining unit 104 may detect occurrence of an event by using a word or a sentence uttered by a person. The event determining unit 104 may detect occurrence of an event by recognizing, for example, a sound asking for help, i.e., a sound on a part of a victim (e.g., "help", "don't shoot", "stop it", "give it back", "kidnapping", and the like), or a threatening sound, i.e., a sound on a part of a criminal (e.g., "hands up", "give it to me", "don't make a noise", "shut up", "be quiet", "I will shoot you", and the like).

Not only the word described above, but also volume or nature thereof (e.g., a frightened look or a confused state, intimidation, a hushed voice, and the like), tone, a language or a dialect, screaming or jeering, and the like may be recognized, and a duration of the recognized sound may be used for a condition for sensing of occurrence of an event. Further, an impact sound (e.g., a traffic accident or the like), a mechanical sound, a burst sound, an explosion sound, a sound wave, a duration of the sounds, and the like may be recognized, and used for a condition for sensing of occurrence of an event.

Further, for example, a voice of a specific person may be registered in advance, and the event determining unit 104 may detect occurrence of an event when a word such as "help" is detected in the voice of the specific person.

The event determining unit 104 can estimate occurrence of an event by combining a plurality of the conditions described above. An estimation condition is exemplified below, but is not limited thereto.

- (b1) "Kidnapping!" and "help" are detected equal to or more than two times, volume is equal to or more than a predetermined value, and a duration of a sound is equal to or more than 10 seconds
- (b2) An impact sound is detected, and a duration of the sound is 10 seconds
- (b3) "Help" is detected equal to or more than two times, and volume is equal to or more than a predetermined value.

The event determining unit 104 may further determine an urgency degree indicating urgency of an event. The event determining unit 104 may determine an urgency degree of an event by using whether a target person includes a specific person. The event determining unit 104 may determine that an urgency degree is a high level, for example, in a case of the above (b1), a case where a voice of a specific person is recognized, or the like, may determine that an urgency degree is a medium level in a case of the above (b2), and may determine that an urgency degree is a low level in a case of the above (b3). The conditions may be able to be set according to occurrence status of an event in an area or the like.

Moreover, a condition that heightens an urgency degree may be registered in advance for each of the specific persons described above, and the event determining unit 104 may heighten an urgency degree when the condition is satisfied.

Further, a condition for determining occurrence of an event may be able to be set according to a season, a time period, a date and time, a type and a place of a facility, and the like as well. That is to say, accuracy of determining occurrence of an event can be improved by specifying a season, a time period, a date and time, a type and a place of a facility, and the like in which an event is likely to occur, and setting a condition. Sound information indicating occurrence of an event for each event, and another condition and status (e.g., a place, a season, a time period, a date and time, and the like in which occurrence is likely) may be machine-learned and modeled.

When the occurrence of an event is detected, the event determining unit 104 determines position information of the microphone 7 that has collected a sound serving as a reason for occurrence sensing of the event, and further determines a time when the sound is occurred within sound data.

Figure 5:
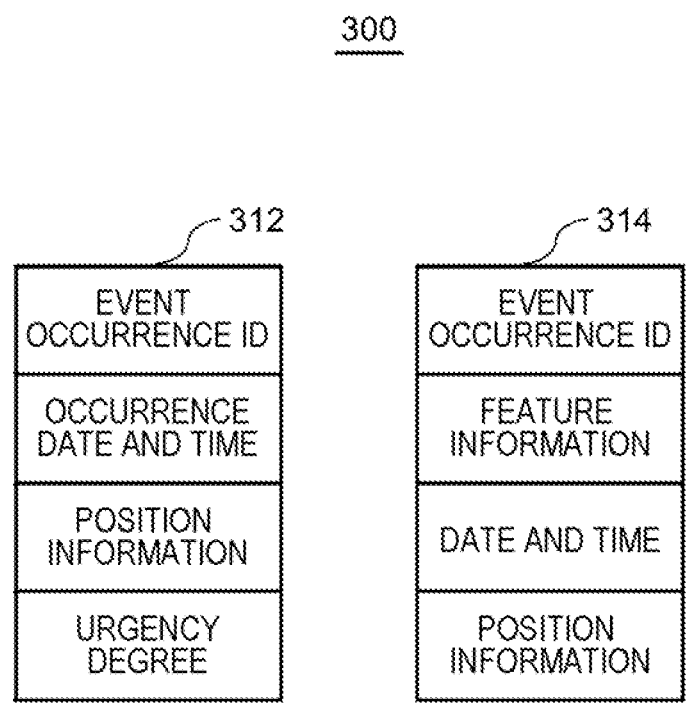
FIG. 5 It is a diagram illustrating a data structure example of various pieces of information stored in the storage apparatus.

The event determining unit 104 stores each determined event (e.g., an event occurrence ID may be given for each event) in an event storage unit 312 in FIG. 5, in association with an occurrence date and time and position information of the event. Further, the event determining unit 104 may associate and store an urgency degree of an event in the event storage unit 312. Further, a type of event to be estimated (not illustrated in FIG. 5) may be associated and stored in the event storage unit 312. The event determining unit 104 may estimate, for a type of event, for example, kidnapping, robbery, pickpocketing, or the like from a word included in a sound. Furthermore, the event determining unit 104 may estimate, for example, a traffic accident, an explosion, a firing, a burst, or the like from a type, volume, a nature, or the like of a sound included in a sound.

Further, the event determining unit 104 may determine the camera 5 installed around an event occurrence location, acquire an image in the camera 5, and further estimate a type of the event, or determine an urgency degree.

The extracting unit 106 refers to the event storage unit 312, or acquires an occurrence date and time and position information of an event transferred from the event determining unit 104, searches movement history information of the related party database 310 by using the acquired date and time and position information, and extracts corresponding feature information. Feature information extracted from an image indicating position information at an event occurrence time point is not limited to one piece of feature information, and a plurality of pieces of feature information may be extracted. The extracted feature information indicates a related moving body being at least one of the moving body 10 being related to an event, and the moving body 10 being present at a location from which the event is witnessable.

A related moving body includes an interested party and a vehicle in an event, a person and a vehicle that have witnessed the event, and a person and a vehicle being related to the event, and may further include a general person and a general vehicle captured in the image. Which moving body is to be determined as a related moving body may be able to be set and changed by a user, or may be set for each system.

For example, in a building or the like where security is set to be high, feature information may be generated with all persons being present in the building as related moving bodies, and movement history information may be generated. In a town or the like, feature information may be registered in advance by determining, as a related moving body, a person such as an important person, a foreigner, a tourist, or the like particularly needing guard or surveillance, and, when the registered feature information is recognized by image processing, movement history information may be generated by determining the person as the related moving body. Further, an action schedule of the registered related moving body may be able to be registered in advance. Movement history information of the related moving body may be generated regarding an image of a date and time and a place following the action schedule. Moreover, regarding a person such as a criminal and a suspect particularly needing surveillance as well, feature information may be registered in advance by determining the person as a related moving body, and, when the registered feature information is recognized by image processing, movement history information may be generated by determining the person as the related moving body. An image of an area where a person is expected to be wanted and hiding may be determined, image processing may be performed, and, when the registered feature information is recognized, movement history information of the related moving body may be generated.

Feature information of the related moving body (hereinafter, also referred to as a related party) being related to the event extracted by the extracting unit 106 may be stored in a related party movement history storage unit 314 in FIG. 5. Note that, the event storage unit 312 and the related party movement history storage unit 314 in FIG. 5 may also be included in the storage apparatus 300. The related party movement history storage unit 314 stores at least one piece of extracted feature information, and a date and time and position information thereof in association with each other, for each event occurrence of which has been detected.

Further, the event determining unit 104 may generate attribute information of an event by using sound information at the occurrence of the event. Then, the extracting unit 106 may search the related party database 310 by further using attribute information of an event as well. Attribute information of an event may include, for example, at least one of a type, magnitude, and an urgency degree of the event.

Note that, in FIGS. 1 and 3, and FIG. 7 described later, the information processing apparatus 100, the image processing apparatus 200, and the sound processing apparatus 210 are each constituted of one piece of hardware (e.g., a server). However, the information processing apparatus 100, the image processing apparatus 200, and the sound processing apparatus 210 may each be constituted of a plurality of pieces of hardware (e.g., a plurality of servers). For example, the image processing apparatus 200 and the movement history generating unit 102 of the information processing apparatus 100 may be implemented by a first server, the sound processing apparatus 210 and the event determining unit 104 of the information processing apparatus 100 may be implemented by a second server, and the extracting unit 106 of the information processing apparatus 100 may be implemented by a third server. Moreover, the image processing apparatus 200, and the movement history generating unit 102 and the extracting unit 106 of the information processing apparatus 100 may be implemented by the first server, and the sound processing apparatus 210 and the event determining unit 104 of the information processing apparatus 100 may be implemented by the second server. However, a combination is not limited thereto.

Operation Example

Figure 6:
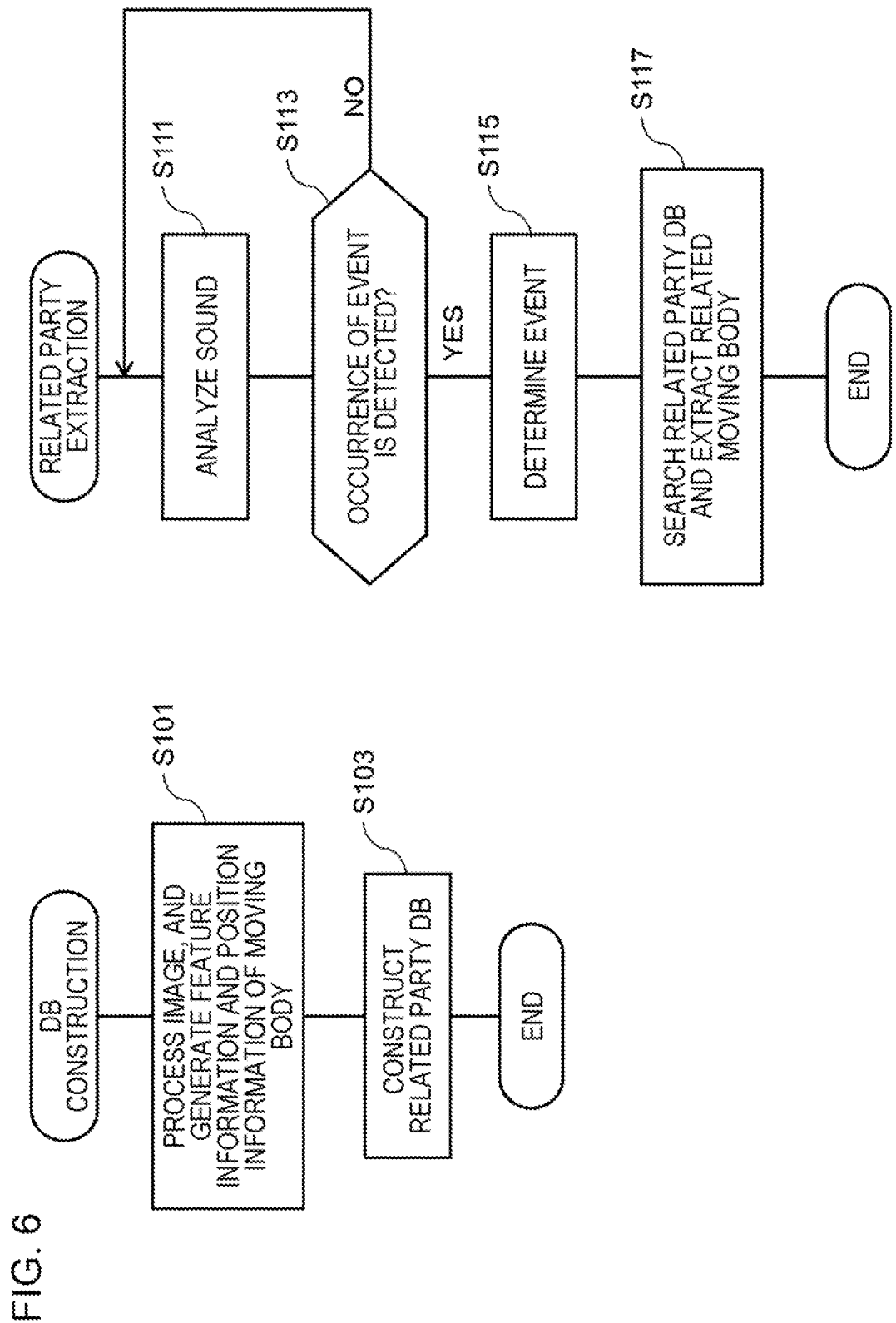
FIG. 6 It is a flowchart illustrating an operation example of the information processing apparatus according to the example embodiment.

FIG. 6 is a flowchart illustrating an operation example of the information processing apparatus 100 according to the present example embodiment.

The information processing apparatus 100 may operate according to two flows of construction processing of the related party database 310, and event sensing and related moving body extracting processing. However, a combination of processing flows is not limited thereto.

<Construction Processing of Related Party Database 310>

First, the movement history generating unit 102 of the information processing apparatus 100 performs the construction processing of the related party database 310. The movement history generating unit 102 causes the image processing apparatus 200 to process an image captured by the camera 5, and generates feature information that determines the moving body 10 being present in a target area and, position information at that time (step S101). Then, the movement history generating unit 102 generates movement history information of the moving body 10 in which the feature information and position information are associated with time information, and stores the generated movement history information in the related party database 310 (step S103).

Specifically, when feature information of the moving body 10 is extracted from within an image by the image processing apparatus 200, the movement history generating unit 102 determines the camera 5 that has captured the image, determines image capturing information such as an image capturing date and time and an installation place (including an image capturing direction, an image capturing range, and the like) of the camera 5, and computes, based on the determined image capturing information, position information and a presence date and time of the moving body 10. Then, the computed position information and the computed date and time of the moving body 10 are registered in the related party database 310 in association with the extracted feature information of the moving body 10. Further, the movement history generating unit 102 computes a movement direction of the moving body 10 by using preceding and succeeding images, and further stores the movement direction of the moving body 10 in association with feature information of movement history information.

Moreover, the movement history generating unit 102 may analyze, by the sound processing apparatus 210, a sound collected by the microphone 7, and store feature information (hereinafter, also referred to as sound feature information) of the sound relating to the specific moving body 10 in movement history information in association with a date and time and position information. The specific moving body 10 is, for example, a specific person or a specific vehicle. The specific person is, for example, an important person, a foreigner, a tourist, or the like, and includes a person particularly needing guard. Further, the specific person may be a wanted person, a suspect, a person requiring attention, or the like, and may particularly include a person needing surveillance.

That is to say, the movement history generating unit 102 may generate the movement history information by use of at least one of an image and a sound.

Sound feature information of the specific person may be further associated with feature information such as a face of the specific person stored in the movement history information of the related party database 310. Sound feature information of a specific person is feature information that can determine the specific person, and may be, for example, a talking voice, a spoken word, a way of talking, a language, a dialect, breathing, a voiceprint, a footstep, a sound of dragging baggage, a sound of clothes and an ornament, a firing sound, or the like of the specific person. Alternatively, sound feature information of a specific vehicle may be stored in the movement history information in association with a date and time and position information. The sound feature information of a specific vehicle is feature information that can determine the specific vehicle, and may be, for example, an engine sound, a sound of a horn, a way of sounding a horn, an opening and closing sound of a door, or the like of the specific vehicle. When a specific person and a specific vehicle are related to each other, pieces of information of the specific person and the specific vehicle may be stored in the movement history information in association with each other.

The construction processing of the related party database 310 may be repeatedly performed regularly, constantly, or at any time. A timing, frequency, and the like of executing the construction processing may be set according to at least one of each region, a type and a place of a facility, a season, a time period, a date and time, and the like. Moreover, movement history information of feature information of the moving body 10 registered in the related party database 310 may be deleted or moved to another storage apparatus as an archive after a predetermined period has elapsed.

<Event Sensing and Related Party Extracting Processing>

Next, the event determining unit 104 causes the sound processing apparatus 210 to perform an analysis of a sound collected by the microphone 7 (step S111), and surveys occurrence of an event (step S113). Then, when occurrence of an event is detected (YES in step S113), the event determining unit 104 determines position information of a location where the event has occurred, and an occurrence date and time (step S115). Then, the extracting unit 106 searches movement history information of the related party database 310 by using the occurrence position information and the occurrence date and time of the event determined in step S115, and extracts a related moving body (step S117).

Specifically, the event determining unit 104 detects occurrence of an event, based on a result of analyzing, by the sound processing apparatus 210, a sound collected by the microphone 7. As described above, the event determining unit 104 detects occurrence of an event by the sound processing apparatus 210, by using a recognition result of a type of sound, a word, volume, nature, tone, a way of talking, a language, a dialect, screaming, jeering, or the like. When a predetermined event occurrence condition is satisfied, the event determining unit 104 detects occurrence of an event. The event determining unit 104 determines an occurrence location and an occurrence time of the detected event, from information such as position information of the microphone 7 that has collected a sound serving as a reason for the event sensing, and a time stamp of sound data. As described above, an urgency degree of an event may also be determined by the event determining unit 104. Information relating to the event occurrence detected by the event determining unit 104 may be stored in the event storage unit 312.

Then, the extracting unit 106 searches movement history information of the related party database 310 by using the position information and information of the date and time of the event occurrence determined by the event determining unit 104. Particularly, it is preferable that the extracting unit 106 searches mainly for information including a time before and after a date and time of event occurrence. Then, at least one piece of feature information associated to a related moving body being related to the event is extracted.

According to the present example embodiment, the movement history generating unit 102 processes an image captured by the camera 5, thereby generates feature information that determines the moving body 10 being present in a target area, and position information at that time, also generates movement history information of the moving body 10 in which feature information and position information are associated with time information, and stores the generated information in the related party database 310. The event determining unit 104 detects occurrence of an event, by analyzes a sound collected by the microphone 7, and determines an occurrence location and a time of the event. The extracting unit 106 searches the related party database 310 by using the occurrence location and the time determined by the event determining unit 104, and thereby extracts feature information of a related moving body.

With the configuration, the information processing apparatus 100 can detect occurrence of an event at an early stage regardless of presence or absence of the camera 5, and find a related moving body including a person being related to the event, from the related party database 310 constructed from an image collected in advance.

Second Example Embodiment

Figure 7:
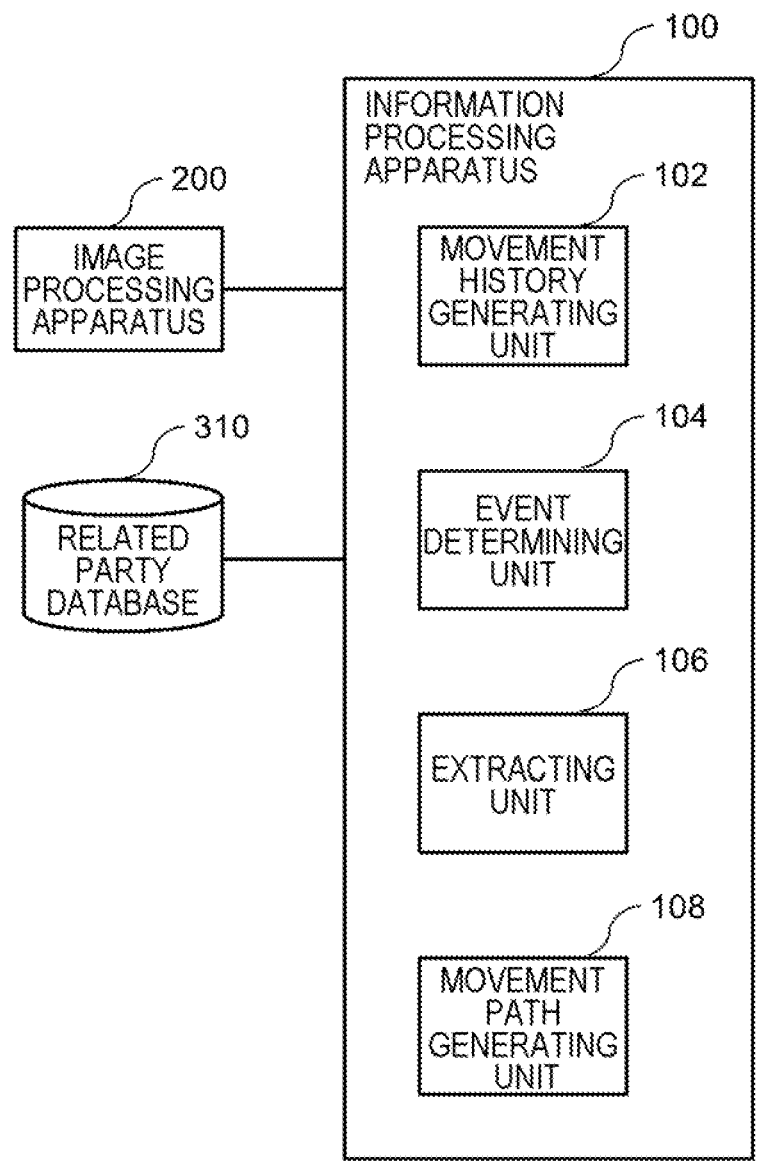
FIG. 7 It is a functional block diagram logically illustrating a configuration example of the information processing apparatus according to the example embodiment.

FIG. 7 is a functional block diagram logically illustrating a configuration example of an information processing apparatus 100 according to the present example embodiment. The information processing apparatus 100 according to the present example embodiment is similar to that according to the example embodiment described above, except that the information processing apparatus 100 according to the present example embodiment includes a configuration that estimates a movement path of feature information of an extracted related moving body. The information processing apparatus 100 in FIG. 7 further includes a movement path generating unit 108 in addition to a configuration of the information processing apparatus 100 in FIG. 3. However, the information processing apparatus 100 according to the present example embodiment may be combined with at least one of components according to another example embodiment within a scope that does not cause a contradiction.

The movement path generating unit 108 processes an image including an image of before and after an occurrence time of an event in a camera 5 arranged around an occurrence location of the event, also analyzes a sound including a sound of before and after an occurrence time of an event in a microphone 7 arranged around the occurrence location of the event, thereby tracks a related moving body, and generates a movement path of the related moving body.

A determining method of the camera 5 or the microphone 7 arranged around an occurrence location of an event can be variously conceived, and is indicated below, but is not limited thereto. Moreover, a plurality of methods below may be combined.

(c1) The camera 5 installed within a radius of 10 meters around position information of the microphone 7 that has collected a sound in which occurrence of an event has been detected is searched from position information of the camera 5 stored in a camera table 302. Alternatively, the microphone 7 installed within a radius of 10 meters around position information of the microphone 7 that has collected the sound in which the occurrence of the event has been detected is searched from position information of the microphone 7 stored in a microphone table 304.

(c2) The camera 5 and the microphone 7 are grouped in advance for each area, each passage, each facility or building, each escape route supposed in advance according to a crime type (a type of estimated event) or an attribute of a criminal (related moving body), or the like, and selects the camera 5 and the microphone 7 that belong to the same group as the microphone 7 that has collected a sound in which occurrence of an event has been detected.

The movement path generating unit 108 causes an image processing apparatus 200 to process an image for a predetermined time before and after an occurrence time of an event among images in the selected camera 5, thereby extracts feature information of the related moving body from the image, and estimates position information and a movement direction of image feature information of the related moving body for each time, based on the position information of the camera 5 that has captured the image from which the image feature information of the related moving body has been extracted, and image capturing information such as an image capturing direction and an image capturing range of the camera 5. The movement path generating unit 108 estimates, in an image captured by the one camera 5, a movement direction and a movement path of a related moving body within an image for a predetermined time before and after an occurrence time of an event, and also estimates, in images captured by a plurality of the adjacent cameras 5, a movement direction and a movement path of the related moving body within an image for a predetermined time before and after an occurrence time of an event.

Further, the movement path generating unit 108 causes a sound processing apparatus 210 to analyze a sound for a predetermined time before and after an occurrence time of an event among sounds of the selected microphone 7, thereby estimates, from the sound, feature information of a sound of a related moving body, and estimates position information and a movement direction of sound feature information of a related moving body for each time, based on position information of the microphone 7 that has collected a sound from which the sound feature information of the related moving body has been extracted, and directivity and sound collection accuracy (a sound-collectable distance range, or the like) of the microphone 7. The movement path generating unit 108 estimates, in a sound collected by the one microphone 7, a movement direction and a movement path of a related moving body within a sound for a predetermined time before and after occurrence time of an event, and also estimates, in sounds collected by a plurality of the adjacent microphone 7, a movement direction and a movement path of the related moving body within a sound for a predetermined time before and after an occurrence time of an event.

Figure 8:
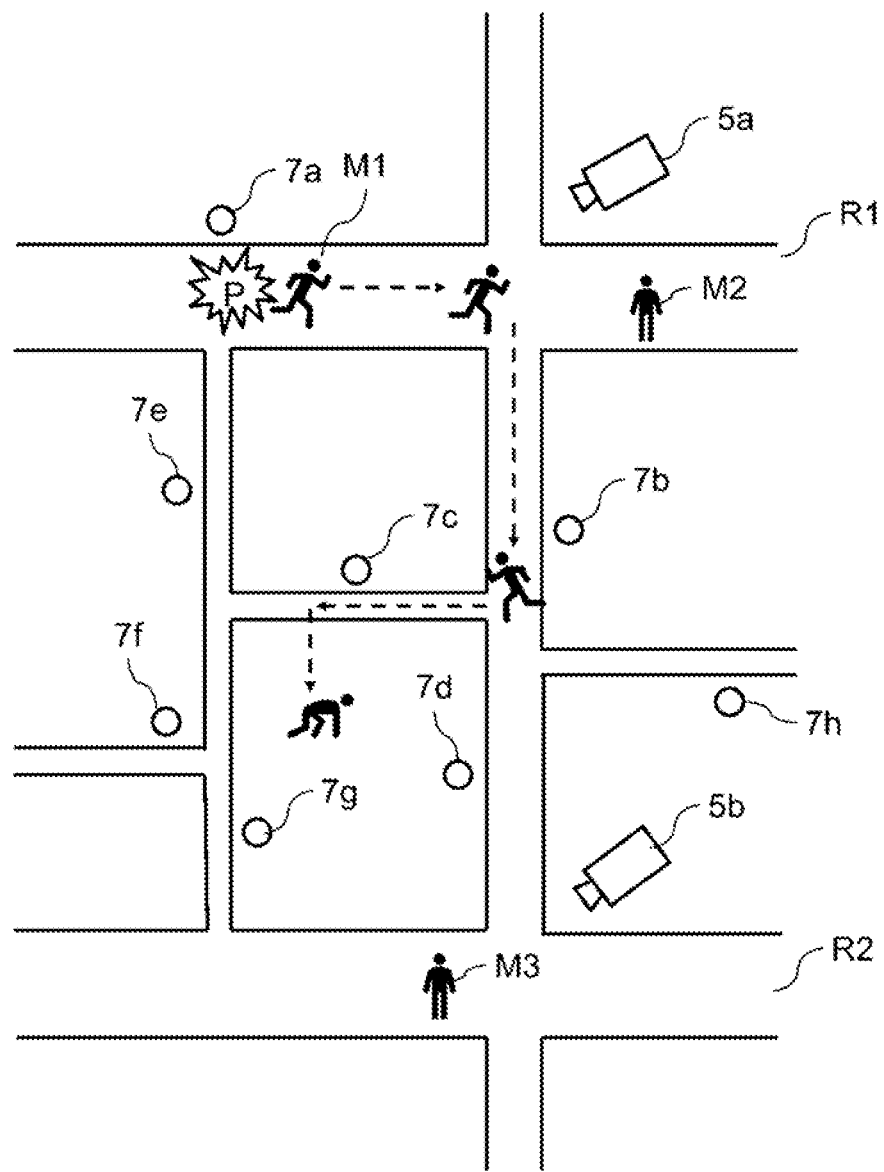
FIG. 8 It is a diagram illustrating an installation example of a camera and a microphone in a certain area.

In the present example embodiment, the camera 5 is installed, for example, at an intersection or the like of a major road, but description is given assuming that the camera 5 is not installed in a back alley, and the microphone 7 is installed in a back alley. FIG. 8 is a diagram illustrating an installation example of the camera 5 and the microphone 7 in a certain area. In the example in the figure, a camera 5a and a camera 5b are installed at intersections of major roads R1 and R2, respectively. Further, a plurality of microphones 7a to 7h are installed in a back alley.

For example, when occurrence of an event is detected from a sound collected by the microphone 7a, the image processing apparatus 200 processes an image captured by the camera 5a around the microphone 7a, and, thereby, feature information of a person M1 being a related moving body is extracted. The movement path generating unit 108 computes, from installation position information of the camera 5a, and image capturing information such as an image capturing direction and an image capturing range, a position and a movement direction of the person M1 at that time point. Since feature information of the person M1 being the related moving body has been extracted from the image captured by the camera 5a, the image processing apparatus 200 processes regarding an image for a predetermined time before and after a time when the event has occurred, among images captured by the camera 5b around the camera 5a, and searches for feature information of the related moving body.

When the person M1 being the related moving body moves into an image capturing range of the camera 5b, a captured image of the camera 5b for a predetermined time before and after a time when an event has occurred is processed by the image processing apparatus 200, thereby, feature information of the person M1 being the related moving body can be extracted, and a movement path of the person M1 being the related moving body can be estimated. On the other hand, when feature information of the person M1 being the related moving body is not extracted within the image, in the camera 5b, for a predetermined time before and after the time when the event has occurred, it can be estimated that the person M1 being the related moving body has not moved into the image capturing range of the camera 5b.

Further, when occurrence of an event is detected from a sound collected by the microphone 7a, the sound processing apparatus 210 performs an analysis regarding a sound for a predetermined time before and after a time when the event has occurred, among sounds collected by the other microphones 7b to 7h around the microphone 7a. The sound processing apparatus 210 extracts, from the sound, sound feature information of the related moving body (e.g., a talking voice, a spoken word, a way of talking, a language, a dialect, breathing, a voiceprint, a cry, a footstep, a sound of dragging baggage, a sound of clothes and an ornament, a firing sound, or the like of the person M1). The movement path generating unit 108 estimates a position and a movement direction of a related moving body, based on position information, directivity, and a sound-collectable distance (range) of the microphone 7 from which the sound feature information of the related moving body has been extracted.

The movement path generating unit 108 searches for sound feature information of the person M1 being the related moving body, from among sounds of the plurality of microphones 7a to 7h for a predetermined time before and after a time when an event has occurred. In the example in FIG. 8, since the person M1 being the related moving body moves along a direction of a broken line arrow, sound feature information of the person M1 being the related moving body is extracted from, for example, a sound collected by the microphone 7b, and thereafter, the sound feature information of the person M1 being the related moving body is extracted from a sound collected by the microphone 7c. Sound feature information of the person M1 being the related moving body is not extracted from sounds collected by the other microphones 7.

Thereafter, it is assumed that sound feature information of the person M1 being the related moving body is extracted from sounds collected by the microphones 7b and 7c along with elapse of time. Accordingly, the movement path generating unit 108 estimates that the person M1 being the related moving body moves in a direction of the camera 5a from a location P where an event has occurred, then turns right, passes in front of the microphone 7b, turns right, goes into a back alley, and hides around the microphone 7c.

Note that, for a person M2 and a person M3 captured in images captured by the camera 5a and the camera 5b, feature information may be registered in a related party database 310 as a related moving body. Particularly, the person M2 may be registered as a person who was able to witness the event.

When extracting feature information of a related moving body from the related party database 310, the extracting unit 106 may determine a relationship with an event at occurrence of the event according to, for example, a distance from an occurrence location to a location where the moving body 10 is present. For example, the extracting unit 106 may determine and extract, as a party being directly concerned with an event, a moving body 10 being present within a radius of 10 meters (first distance) from an occurrence location of the event. Alternatively, the extracting unit 106 may determine and extract, as a witness of an event or a person involved in the event, the moving body 10 being present within a radius of 15 to 50 meters (a second distance being more distant than the first distance) from an occurrence location of the event.

A movement path of a related moving body is generated from position information, for each time, of the related moving body tracked by the movement path generating unit 108. The movement path generated by the movement path generating unit 108 is stored in a related party movement history storage unit 314 in association with date and time information for each event.

Operation Example

Figure 9:
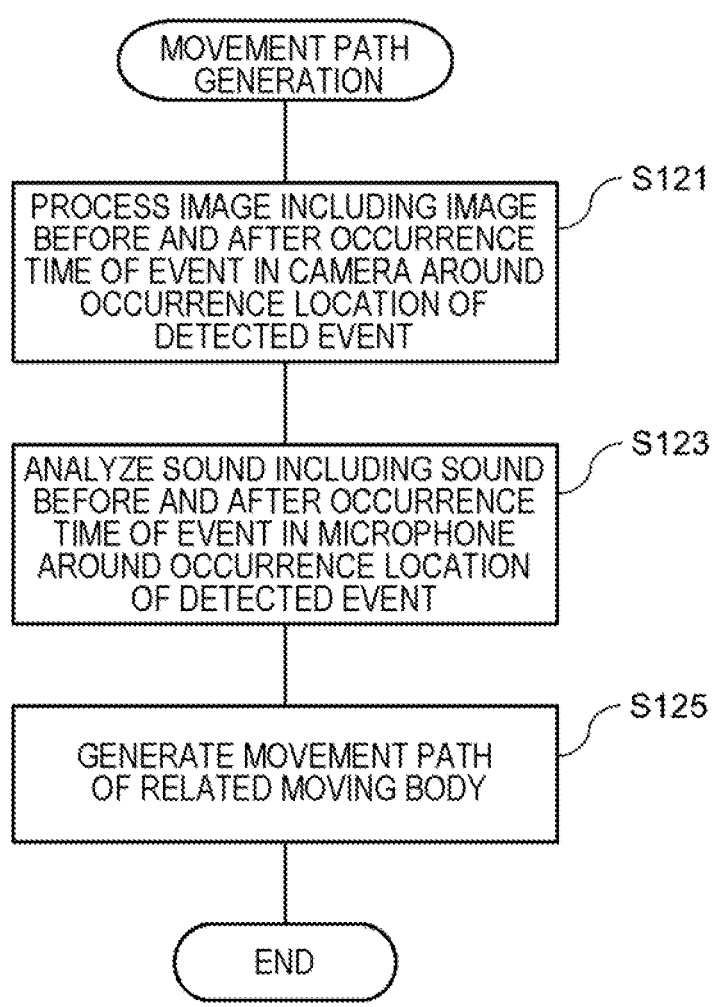
FIG. 9 It is a flowchart illustrating an operation example of the information processing apparatus according to the example embodiment.

FIG. 9 is a flowchart illustrating an operation example of the information processing apparatus 100. A procedure of movement path generating processing by the movement path generating unit 108 is described by using FIG. 9.

First, the movement path generating unit 108 causes the image processing apparatus 200 to process an image including an image before and after an occurrence time of an event in the camera 5 around an occurrence location of the detected event (step S121). When feature information of a related moving body is included in the image in the camera 5, the feature information is extracted, and position information and a date and time are determined. Then, the movement path generating unit 108 may store the date and time and the position information in a related party movement history storage unit 314 in association with the feature information of the determined related moving body.

Next, the movement path generating unit 108 causes the sound processing apparatus 210 to analyze a sound including a sound before and after an occurrence time of an event in the microphone 7 around the occurrence location of the detected event (step S123). When sound feature information of a related moving body is included in the sound in the microphone 7, the sound feature information is extracted, and position information and a date and time are determined. Then, the movement path generating unit 108 may store the date and time and the position information in the related party movement history storage unit 314 in association with the sound feature information of the determined related moving body.

The movement path generating unit 108 combines, in a time-series way, the position information and a movement direction of the related moving body determined from the image in step S121 and the position information and a movement direction of the related moving body determined from the sound in step S123, and generates a movement path of the related moving body (step S125). The generated movement path may be stored in the related party movement history storage unit 314.

Moreover, sound analysis processing in step S123 may be performed regarding a sound collected by the microphone 7 installed around the movement path estimated from the position information of the related moving body determined in step S121. That is to say, a position interval on a rough movement path by the position information of the related moving body determined by image processing is compensated with position information determined by a sound analysis, and, thereby, a more detailed movement path can be estimated.

Further, the movement path generating unit 108 may compute a movement velocity of the related moving body from a movement of position information of the related moving body for each time. The movement path generating unit 108 may further determine a movement means of a related moving body from the movement velocity of the related moving body. The movement means includes, for example, walking, running, a bicycle, a motorcycle, an automobile, a bus, a train, and the like.

Further, the movement path generating unit 108 may estimate a movement destination at a predetermined time ahead from a movement path of the determined related moving body, based on a movement direction, a movement velocity, and a movement means of the related moving body. A plurality of candidates may be estimated as movement destinations to be estimated. Further, the movement path generating unit 108 may compute accuracy of a plurality of candidates.

The movement path generating unit 108 computes a candidate location of a movement destination of the related moving body for each time. An extracting unit 106 may extract, as an interested party of an event among related moving bodies, a moving body being present within a radius of 10 meters (third distance) around the candidate location, and cause the movement path generating unit 108 to generate a movement path of the related moving body. Moreover, a moving body being present within a radius of 15 to 50 meters (a fourth distance being more distant than the third distance) around the candidate location may be extracted as an interested party of an event, and the movement path generating unit 108 may be caused to generate a movement path of the related moving body. Feature information of the related moving bodies extracted by the extracting unit 106 may be further stored in the related party movement history storage unit 314.

The extracting unit 106 may determine whether a specific person (e.g., an important person) or the like registered in advance is included in the extracted related moving body. When a specific person is included, an urgency degree may be heightened.

According to the present example embodiment, the movement path generating unit 108 processes an image including an image before and after an occurrence time of an event in the camera 5 arranged around an occurrence location of the event, also analyzes a sound including a sound before and after the occurrence time of the event in the microphone 7 arranged around the occurrence location of the event, and thereby generates a movement path of a related moving body.

Thereby, the information processing apparatus 100 can estimate a movement path of a related moving body being related to an event, and tracking of the related moving body becomes possible.

Third Example Embodiment

Figure 10:
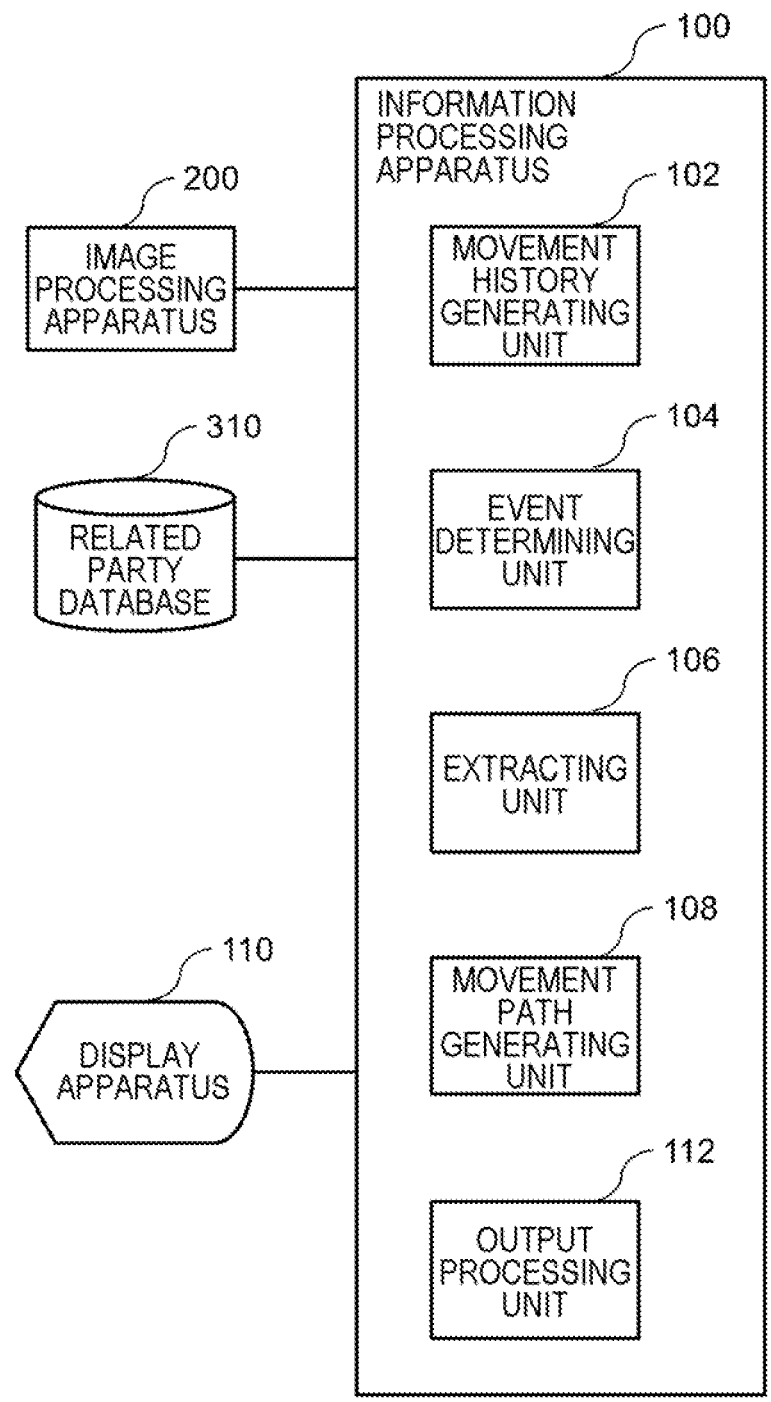
FIG. 10 It is a functional block diagram logically illustrating a configuration example of the information processing apparatus according to the example embodiment.

FIG. 10 is a functional block diagram logically illustrating a configuration example of an information processing apparatus 100 according to the present example embodiment. The information processing apparatus 100 according to the present example embodiment is similar to that according to the example embodiment described above except that the information processing apparatus 100 according to the present example embodiment includes a configuration that performs output processing of information relating to an occurrence event or a related moving body. The information processing apparatus 100 in FIG. 10 further includes an output processing unit 112 in addition to the configuration of the information processing apparatus 100 in FIG. 7. Further, the information processing apparatus 100 is connected to a display apparatus 110. However, the information processing apparatus 100 according to the present example embodiment may be combined with at least one of components according to another example embodiment within a scope that does not cause a contradiction.

Function Configuration Example

The output processing unit 112 outputs, to a predetermined output destination as notification information, at least one of information relating to an event detected by an event determining unit 104 and a movement path of a related moving body generated by a movement path generating unit 108. The output destination can be variously conceived, but, for example, may be a monitor screen for surveillance of the display apparatus 110 at a surveillance center, may be a terminal (not illustrated) carried by a police officer, a security guard, or the like, or may be a monitor screen for surveillance of a display apparatus (not illustrated) at a police station.

Furthermore, the output destination may be a terminal (not illustrated) carried by a predetermined person staying around occurrence of an event. The predetermined person is, for example, a person who is around an event occurrence location or a movement path of a related moving body, and may include a clerk of a store, a person moving in a town such as a delivery person, a staff member and a driver of a public transportation such as a bus or a streetcar, a taxi driver, an attendant and a tourist of travel, and the like.

An application for receiving notification in advance may be installed and activated in a terminal to be an output destination, and the terminal may be able to receive notification by waiting in a state of receiving the notification. Moreover, after receiving the notification, the terminal may be able to display a movement path of a related moving body of an event that has occurred, by logging in to a predetermined website in which user registration has been performed in advance.

An output method includes at least one of display on a monitor screen, transmission of an email, and output of a sound or an alarm sound from a speaker (not illustrated). A destination of at least one of an email address to be a transmission destination of the email, an IP address of a mobile terminal, and a mobile phone number may be registered in advance, or input may be accepted at transmission.

A terminal includes a mobile phone, a smartphone, a tablet terminal, a personal digital assistant (PDA), a notebook personal computer (PC), and the like.

An output content may include, as notification information relating to a detected event, information such as an occurrence time of an event, an occurrence place, a type of event, a content of an event, damage status due to an event, the number of related moving bodies, information of a related moving body (a face photograph, or attribute information analyzed from an image (e.g., gender, age, appearance, clothes, and the like), and a movement path. An output content may include a message informing occurrence of an event and calling for evacuation, or a message requesting coping with an event as described later. A movement path may be mapped on a map and displayed in a superimposed way. It is preferable that an estimated movement means (walking, a bicycle, a small car, a medium-sized car, a large car, a motorcycle, or the like) utilized by a related moving body is also displayed. Further, an image captured by a camera 5 on the movement path may be displayed. A plurality of candidates may be output as movement paths. A plurality of candidates may also be output as movement destinations.

Further, the output processing unit 112 may display a map indicating a movement path, and a video of the camera 5 installed on the movement path, on a display at a surveillance center in a multi-display way.

Moreover, the information processing apparatus 100 may further include an operation acceptance unit (not illustrated). The operation acceptance unit accepts an operation of an administrator of a surveillance system 1 on various screens displayed on the display apparatus 110. Alternatively, the operation acceptance unit may accept an operation of a specific person on a screen displayed on a mobile terminal of the specific person. In this case, an application installed on a mobile terminal of a specific person may accept the operation, transmit an operation content to the information processing apparatus 100, and the operation acceptance unit may receive the operation content, or the operation acceptance unit may accept an operation on a screen displayed by accessing a predetermined website.

The output processing unit 112 may transmit notification information by selecting a terminal of a person who is around an occurrence location of an event or a movement destination of a related moving body, for example, a terminal to be an output destination by acquiring position information indicated by a global positioning system (GPS) receiver of the terminal. Further, the output processing unit 112 may select at least one terminal as an output destination from top in order of proximity in distance to an event occurrence location or a movement destination of a related moving body, and transmit notification information. Further, the output processing unit 112 may determine a terminal of a person who is capable of arriving at an event occurrence location or a movement destination of a related moving body as soon as possible, and transmit notification information. The output processing unit 112 may compute a movement velocity of a terminal from history information of position information of the terminal, determine a movement means of the terminal, thereby compute a movement time from a position of the terminal to an event occurrence location or a movement destination of a related moving body, select at least one terminal as an output destination from top in ascending order of movement time, and transmit notification information. However, the movement path generating unit 108 may perform selection processing of a terminal to be an output destination.

A purpose of notification to a terminal is (d1) a request for response to an occurrence event, (d2) an evacuation instruction from an occurrence event, or the like. On a terminal side, a time in which a request for response is acceptable, or a time in which the request cannot be accepted may be able to be set.

A screen for notifying notification information on a terminal may include the following.
- (e1) Display of an urgency degree of an event, and a content of an assumed event
- (e2) Display of a tool and equipment necessary for response
- (e3) Display of an occurrence place of an event
- (e4) Display of an approval button/rejection button to a response request When the operation acceptance unit accepts pressing of the approval button on a terminal, detailed information of a response content is transmitted to the terminal that has responded to the response request, and displayed on a screen. Specifically, the following information may be transmitted.
- (f1) Information (including an image) relating to a related moving body (a person or a vehicle), an image (may be a video) and a sound of an event site
- (f2) Display of a message requesting a related moving body for contact (implementation of a hearing), and an approval button/rejection button for the request When the operation acceptance unit receives pressing of the approval button for a contact request on the terminal, a hearing item list to a related moving body is transmitted to the terminal that has responded to the request, and displayed on the screen. The hearing item list includes a question item to the related moving body, such as when, where, and what the related moving body is doing, and what the related moving body is doing here now. Moreover, it is preferable that, as a content of the hearing, a plurality of contents are prepared for each condition such as an attribute of a related moving body, a type of an event, an urgency degree, and an area of an event occurrence location. The output processing unit 112 may automatically determine a condition and select a hearing content, or a user who is responding may be able to select and change a condition in a pull-down format.

Further, during a hearing, recording may be performed in such a way that an image of a state of a hearing is captured in cooperation with a camera of a terminal of a user, a body camera with which the user is equipped, or the like, and a sound is be recorded. Further, an answer content of a related moving body to a hearing may be automatically extracted by sound recognition from a sound of a conversation during a hearing, and an answer input may be accepted. Further, a modification or addition of a content may be made to a sound-recognized content by an edit screen. However, it is preferable that a change history is also recorded.

Implementation status of a hearing (e.g., unimplemented, taking action, completed, and the like) may be transmitted to a terminal of a surveillance center or an administrator, a terminal of another specific person that has received notification, or the like, and may be displayed on a screen.

It is preferable that a video in a hearing is transmitted at a terminal to a surveillance center in real time, and displayed on a screen. The output processing unit 112 processes an image transmitted from the terminal by using an image processing apparatus 200, and thereby generates the following information.
- (g1) Implement identification of personal data of a related moving body (related party)

(g2) Search for a past criminal record of a related moving body (related party or a vehicle)

(g3) Analyze a movement of an eye and a sweating amount of a related moving body (related party) (estimate a psychological state)

(g4) Analyze an operation of a related moving body (related party)

The information described above may evaluate correctness and credibility of a result of a hearing, and may be stored in a storage apparatus 300 as hearing record information together with the result of the hearing received from the terminal. In an evaluation method, for example, a point is provided for each of the items (g1) to (g4) described above in such a way that credibility may be evaluated to be higher as the number of points is higher, and an evaluation point may be computed by adding up the number of points for each item. Credibility may be evaluated to be higher as the number of points is higher. The number of points for each item and the total number of points may also be stored in hearing record information.

An evaluation result may be transmitted to a terminal during a hearing, in real time during the hearing. When an evaluation result with low credibility is acquired, a content of a hearing item may be able to be changed. The output processing unit 112 may automatically make the change, or a user performing a hearing may make the change by selecting from a list in a pull-down format, while looking at a displayed evaluation result.

Although the example embodiments of the present invention have been described above with reference to the drawings, the example embodiments are exemplifications of the present invention, and various configurations other than the above can be adopted.

EXAMPLES

When the present surveillance system 1 is constructed, various cases can be considered, such as a case where real-time performance of surveillance is regarded as important, and a case where lightness (high-speed performance) of an operation is regarded as important. Hereinafter, an example 1 of the surveillance system 1 implementing real-time surveillance and an example 2 of the surveillance system 1 implementing lightness (high-speed performance) of an operation are described.

Example 1

Figure 11:
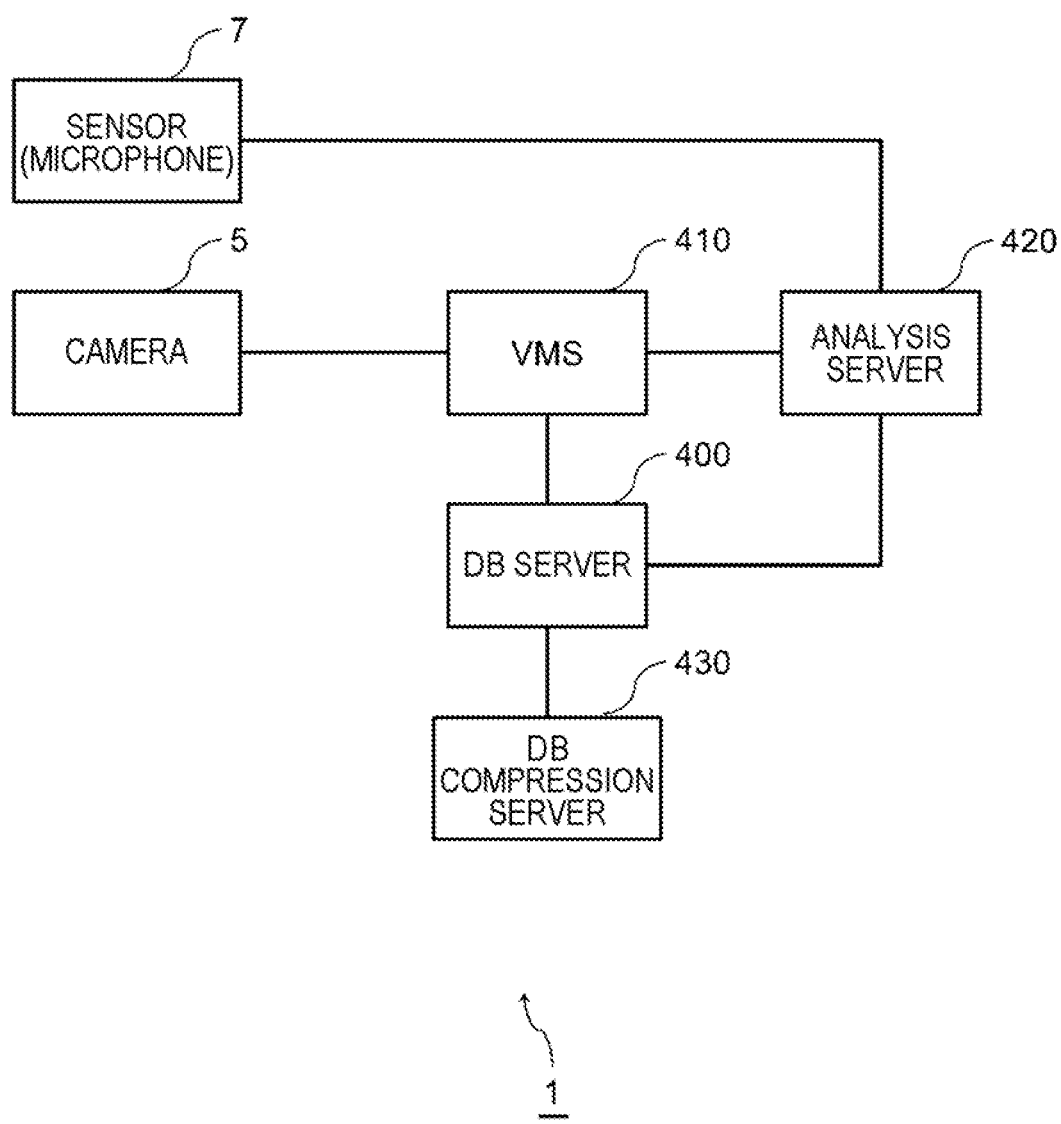
FIG. 11 It is a diagram illustrating a configuration example of a surveillance system of an example 1.

The surveillance system 1 according to the example 1 includes a configuration implementing real-time surveillance. FIG. 11 is a diagram illustrating a configuration example of the surveillance system 1 according to the example 1.

The surveillance system 1 includes a DB server 400, a video management system (VMS) 410, an analysis server 420, a DB compression server 430, a camera 5, and a microphone (including various sensors) 7. The DB server 400 is equivalent to the information processing apparatus 100 and the storage apparatus 300 according to the above example embodiments. The analysis server 420 is equivalent to the image processing apparatus 200 and the sound processing apparatus 210 according to the above example embodiments.

In the surveillance system 1 according to the example 1, a storage apparatus of the DB server 400 needs a large capacity and is costly, and, therefore, the capacity of the DB server 400 is suppressed by using the DB compression server 430.

Figure 12:
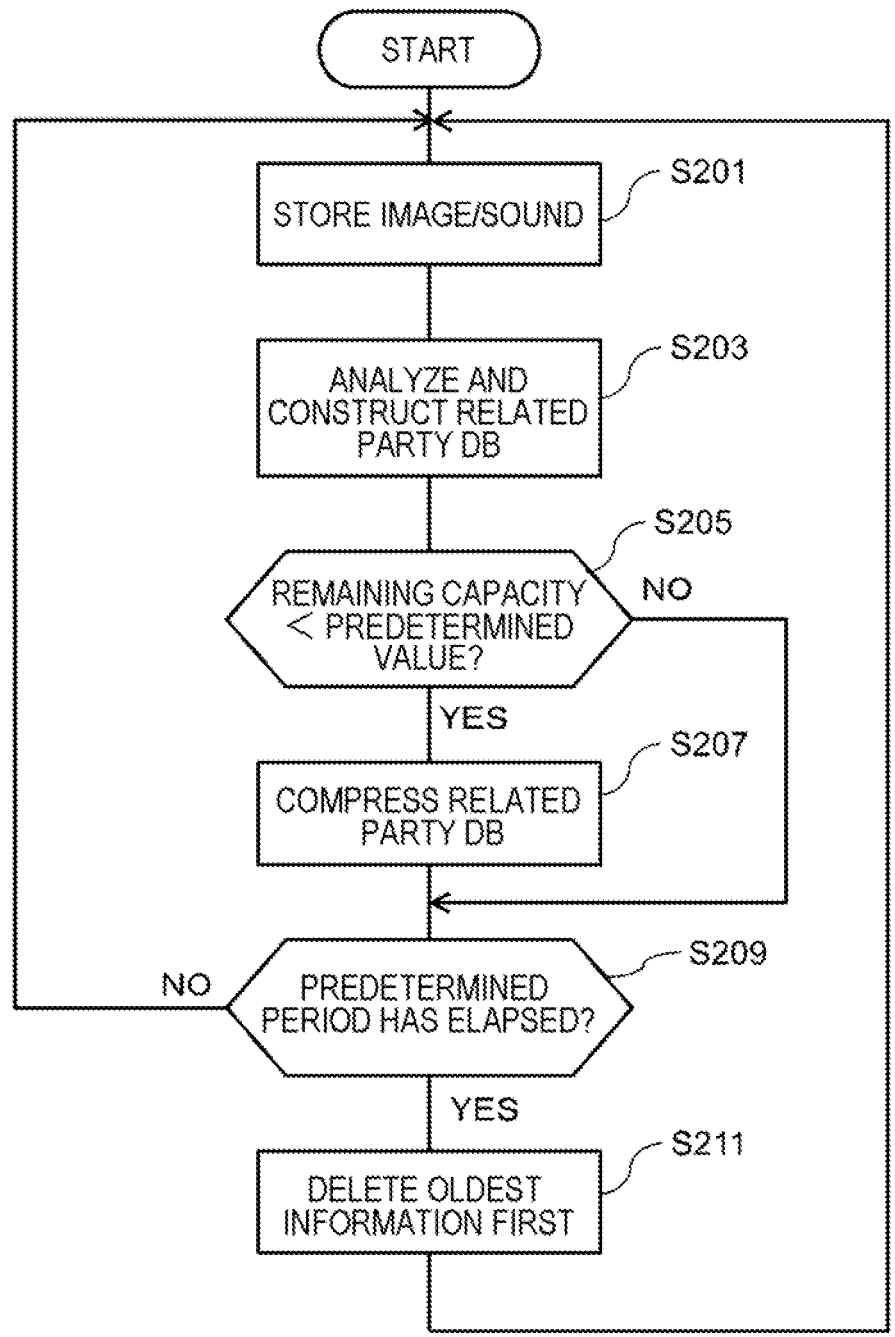
FIG. 12 It is a flowchart illustrating an operation example of the surveillance system of the example 1.

FIG. 12 is a flowchart illustrating an operation example of the surveillance system 1 according to the example 1. The flow is constantly executed in real time. First, the VMS 410 acquires, from the camera 5, and stores an image in real time. Further, the DB server 400 acquires, from the microphone 7, and stores a sound in real time (step S201). Then, the analysis server 420 processes the image stored in the VMS 410, and the DB server 400 constructs a related party database 310 (step S203).

Then, when a remaining capacity of the storage apparatus of the DB server 400 becomes less than a predetermined value (YES in step S205), the DB compression server 430 compresses and stores the related party database 310 in order from oldest information (step S207). At this time, compressed original information may be deleted from the storage apparatus of the DB server 400. When a remaining capacity of the storage apparatus of the DB server 400 is not less than the predetermined value (NO in step S205), step S207 is bypassed, and compression processing of the related party database 310 is not performed.

Further, when a predetermined period has elapsed (YES in step S209), compressed data stored in the DB compression server 430 are deleted in order from oldest (step S211). The predetermined period is, for example, 30 days or the like. While the predetermined period has not elapsed (NO in step S209), step S211 is bypassed, and data deletion is not performed. In the example 1, the flow is constantly and repeatedly executed in real time. Meanwhile, a related party extracting processing flow in FIG. 6 described in the above example embodiment is also constantly and repeatedly executed in real time. Thereby, in the example 1, occurrence of an event can be taken in real time, the related party database 310 constructed in real time can be searched, and extraction of a related moving body can be performed. For example, the surveillance system 1 according to the example 1 is suitable in an area where occurrence frequency of an event is high.

Example 2

The surveillance system 1 according to the example 2 includes a configuration implementing lightness (high-speed performance) of an operation. The surveillance system 1 according to the example 2 includes the same configuration as that according to the example 1. However, the surveillance system 1 according to the example 2 may not include a DB compression server 430, and the following operation example is described with a configuration that includes the DB compression server 430.

Figure 13:
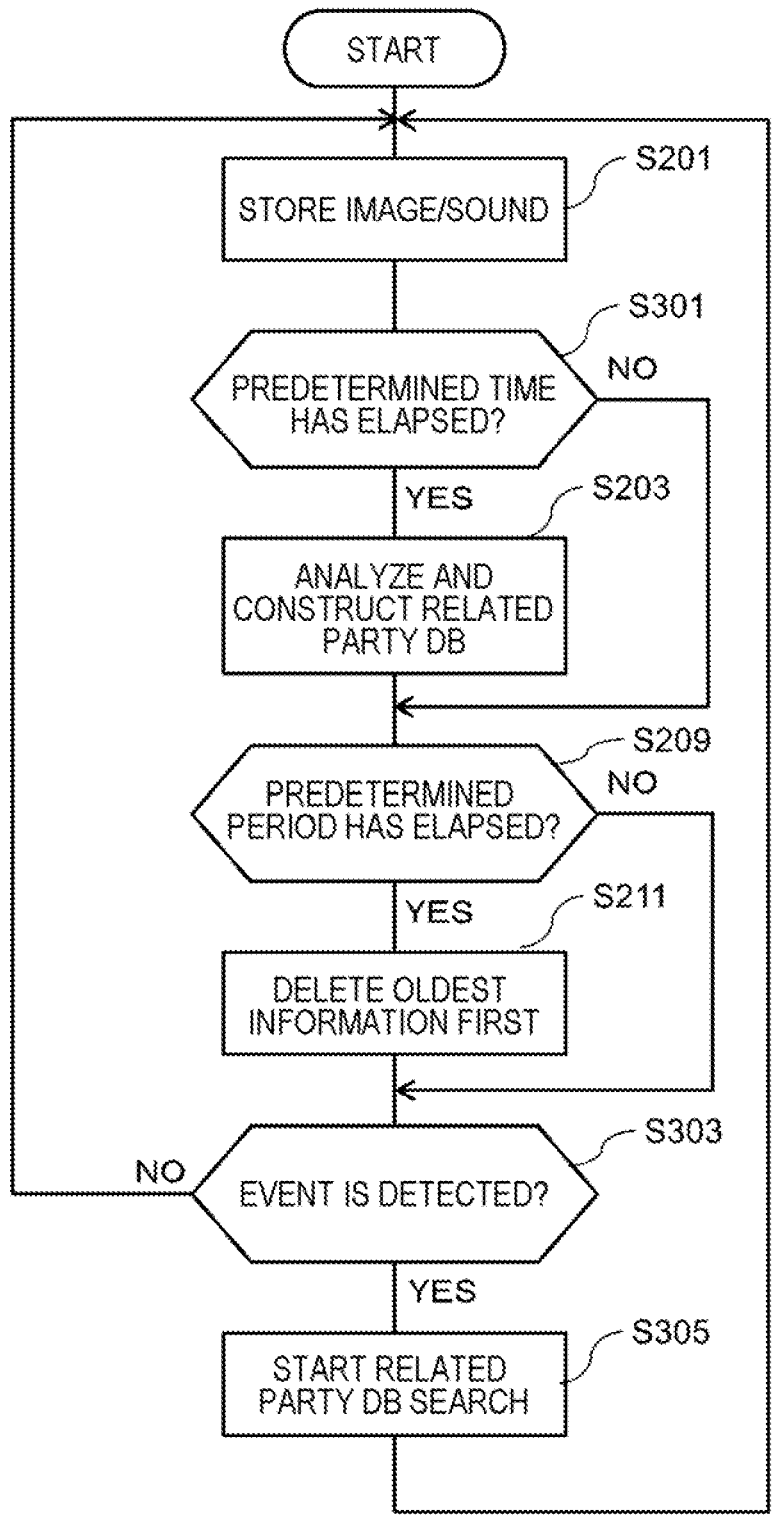
FIG. 13 It is a flowchart illustrating an operation example of a surveillance system of an example 2.

FIG. 13 is a flowchart illustrating an operation example of the surveillance system 1 according to the example 2. The flow is also constantly executed in real time. First, a VMS 410 acquires, from a camera 5, and stores an image in real time. Further, a DB server 400 acquires, from a microphone 7, and stores a sound in real time (step S201). When a predetermined time elapses (YES in step S301), an analysis server 420 processes the image stored in the VMS 410, and the DB server 400 constructs a related party database 310 (step S203). Herein, the predetermined time is, for example, 15 minutes. Then, while the predetermined time has not elapsed, step S203 is bypassed, and construction processing of the related party database 310 is not performed.

Further, when a predetermined period has elapsed (YES in step S209), compressed data stored in the DB compression server 430 are deleted in order from oldest (step S211). The predetermined period is, for example, 30 days or the like. While the predetermined period has not elapsed (NO in step S209), step S211 is bypassed, and data deletion is not performed.

Then, a related party extracting processing flow in FIG. 6 described in the above example embodiment is executed. When the analysis server 420 analyzes the sound acquired from the microphone 7 in real time, and an event is detected (YES in step S303), the DB server 400 starts search processing of the related party database 310 (step S305). Then, the processing returns to step S201. Processing in and after step S201 may be performed in parallel with search processing started by step S305. When no event is detected (NO in step S303), the processing returns to step S201.

In the configuration according to the example 2, a processing load of a server can be reduced by performing construction processing of the related party database 310 at each predetermined time. For example, the surveillance system 1 according to the example 2 is suitable for such a case that frequency at which search processing of the related party database 310 is performed after event sensing is low in an area where there is a little occurrence of an event.

While the invention of the present application has been described above with reference to the example embodiments and examples, the invention of the present application is not limited to the example embodiments and examples described above. Various modifications understandable to a person skilled in the art can be made to a configuration and details of the invention of the present application within the scope of the invention of the present application.

Note that, when information relating to a user is acquired and/or utilized in the present invention, the acquisition and utilization are to be performed legally.

Hereinafter, an example of a reference mode is supplementarily noted.

1. An information processing apparatus including:
   a movement history generating unit that generates feature information determining a moving body being present in a target area, and position information at that time, by processing an image, also generates movement history information, of the moving body, associating the feature information and the position information with time information, and stores the generated information in a related party database;
   an event determining unit that detects occurrence of an event, by analyzing a sound being associated with position information and time information, thereby sensing, and determines an occurrence location and a time of the event; and
   an extracting unit that extracts feature information of a related moving body being at least one of the moving body being related to the event, and the moving body being present at a location from which the event is witnessable, by searching the related party database by using the occurrence location and time determined by the event determining unit.

2. The information processing apparatus according to supplementary note 1, wherein
   the moving body includes at least one of a person and a vehicle.

3. The information processing apparatus according to supplementary note 1 or 2, further including
   a movement path generating unit that generates a movement path of the related moving body, by processing an image including an image before and after an occurrence time of the event in a camera arranged around an occurrence location of the event, and analyzing a sound including a sound before and after the occurrence time of the event in a microphone arranged around the occurrence location of the event.

4. The information processing apparatus according to supplementary note 3, wherein
   the movement path generating unit computes a movement velocity of the related moving body from the position information of the related moving body for each time, and determines a movement means of the related moving body from the computed movement velocity.

5. The information processing apparatus according to any one of supplementary notes 1 to 4, wherein
   the movement history generating unit
   uses at least one of the image and the sound, when generating the movement history information.

6. The information processing apparatus according to any one of supplementary notes 1 to 5, wherein
   the event determining unit detects the occurrence of the event by using a word or a sentence uttered by a person.

7. The information processing apparatus according to any one of supplementary notes 1 to 6, wherein
   the event determining unit generates attribute information of the event by using sound information at the occurrence of the event, and
   the extracting unit searches the related party database by further using the attribute information of the event as well.

8. The information processing apparatus according to supplementary note 7, wherein
   the attribute information of the event includes at least one of a type, magnitude, and urgency of the event.

9. The information processing apparatus according to supplementary note 8, wherein
   the event determining unit determines the urgency of the event by using whether a target person includes a specific person.

10. An information processing method including,
    by an information processing apparatus:
    generating feature information determining a moving body being present in a target area, and position information at that time, by processing an image also generating movement history information, of the moving body, associating the feature information and the position information with time information, and storing the generated information in a related party database;
    detecting occurrence of an event, by analyzing a sound being associated with position information and time information, and determining an occurrence location and a time of the event; and
    extracting feature information of a related moving body being at least one of the moving body being related to the event, and the moving body being present at a location from which the event is witnessable, by searching the related party database by using the determined occurrence location and time.

11. The information processing method according to supplementary note 10, wherein
    the moving body includes at least one of a person and a vehicle.

12. The information processing method according to supplementary note 10 or 11, further including,
    by the information processing apparatus,
    generating a movement path of the related moving body, by processing an image including an image before and after an occurrence time of the event in a camera arranged around an occurrence location of the event, and analyzing a sound including a sound before and after the occurrence time of the event in a microphone arranged around the occurrence location of the event.

13. The information processing method according to supplementary note 12, further including,
by the information processing apparatus,
computing a movement velocity of the related moving body from the position information of the related moving body for each time, and determining a movement means of the related moving body from the computed movement velocity.

14. The information processing method according to any one of supplementary notes 10 to 13, further including,
by the information processing apparatus,
using at least one of the image and the sound, when generating the movement history information.

15. The information processing method according to any one of supplementary notes 10 to 14, further including,
by the information processing apparatus,
detecting the occurrence of the event by using a word or a sentence uttered by a person.

16. The information processing method according to any one of supplementary notes 10 to 15, further including,
by the information processing apparatus:
generating attribute information of the event by using sound information at the occurrence of the event; and
searching the related party database by further using attribute information of the event as well.

17. The information processing method according to supplementary note 16, wherein
the attribute information of the event includes at least one of a type, magnitude, and urgency of the event.

18. The information processing method according to supplementary note 17, further including,
by the information processing apparatus,
determining the urgency of the event by using whether a target person includes a specific person.

19. A program causing a computer to execute:
a procedure of generating feature information determining a moving body being present in a target area, and position information at that time, by processing an image, also generating movement history information, of the moving body, associating the feature information and the position information with time information, and storing the generated information in a related party database;
a procedure of detecting occurrence of an event, by analyzing a sound being associated with position information and time information, and determining an occurrence location and a time of the event; and
a procedure of extracting feature information of a related moving body being at least one of the moving body being related to the event, and the moving body being present at a location from which the event is witnessable, by searching the related party database by using the determined occurrence location and time.

20. The program according to supplementary note 19, wherein
the moving body includes at least one of a person and a vehicle.

21. The program according to supplementary note 19 or 20, further causing the computer to execute
a procedure of generating a movement path of the related moving body by processing an image including an image before and after an occurrence time of the event in a camera arranged around an occurrence location of the event, and analyzing a sound including a sound before and after the occurrence time of the event in a microphone arranged around the occurrence location of the event.

22. The program according to supplementary note 21, further causing the computer to execute
A procedure of computing a movement velocity of the related moving body from the position information of the related moving body for each time, and determining a movement means of the related moving body from the computed movement velocity.

23. The program according to any one of supplementary notes 19 to 22, further causing the computer to execute
a procedure of using at least one of the image and the sound, when generating the movement history information.

24. The program according to any one of supplementary notes 19 to 23, further causing the computer to execute
a procedure of detecting the occurrence of the event by using a word or a sentence uttered by a person.

25 The program according to any one of supplementary notes 19 to 24, further causing the computer to execute:
a procedure of generating attribute information of the event by using sound information at the occurrence of the event; and
a procedure of searching the related party database by further using attribute information of the event as well.

26. The program according to supplementary note 25, wherein
the attribute information of the event includes at least one of a type, magnitude, and urgency of the event.

27. The program according to supplementary note 26, further causing the computer to execute
a procedure of determining the urgency of the event by using whether a target person includes a specific person.

REFERENCE SIGNS LIST

1 Surveillance system
3 Communication network
5 Camera
7 Sensor
10 Moving body
100 Information processing apparatus
102 Movement history generating unit
104 Event determining unit
106 Extracting Selection-unit
108 Movement path generating unit
110 Display apparatus
112 Output processing unit
200 Image processing apparatus
210 Sound processing apparatus
300 Storage apparatus
302 Camera table
304 Microphone table
306 Image storage unit
308 Sound storage unit
310 Related party database
312 Event storage unit
314 Related party movement history storage unit
1000 Computer
1010 Bus
1020 Processor
1030 Memory
1040 Storage device
1050 Input/output interface 1060 Network interface

What is claimed is:

1. An information processing apparatus comprising:
at least one memory storing instructions; and
at least one processor configured to execute the instructions to:
generate feature information determining a moving body being present in a target area, and position information at that time, by processes an image, also generate movement history information, of the moving body, associating the feature information and the position information with time information, and store the generated information in a related party database;
detect occurrence of an event, by analyzing a sound being associated with position information and time information, and determine an occurrence location and a time of the event;
extract feature information of a related moving body being at least one of the moving body being related to the event, and the moving body being present at a location from which the event is witnessable, by searching the related party database by using the determined occurrence location and time determined; and
generate a movement path of the related moving body, by processing an image including an image before and after an occurrence time of the event in a camera arranged around an occurrence location of the event, and analyzing a sound including a sound before and after the occurrence time of the event in a microphone arranged around the occurrence location of the event.

2. The information processing apparatus according to claim 1, wherein the moving body includes at least one of a person and a vehicle.

3. The information processing apparatus according to claim 1, wherein the at least one processor is further configured to execute the instructions to compute a movement velocity of the related moving body from the position information of the related moving body for each time, and determine a movement means of the related moving body from the computed movement velocity.

4. The information processing apparatus according to claim 1, wherein the at least one processor is further configured to execute the instructions to use at least one of the image and the sound, when generating the movement history information.

5. The information processing apparatus according to claim 1, wherein the at least one processor is further configured to execute the instructions to detect the occurrence of the event by using a word or a sentence uttered by a person.

6. The information processing apparatus according to claim 1, wherein the at least one processor is further configured to execute the instructions to:
generate attribute information of the event by using sound information at the occurrence of the event, and
search the related party database by further using the attribute information of the event.

7. The information processing apparatus according to claim 6, wherein the attribute information of the event includes at least one of a type, magnitude, and urgency of the event.

8. The information processing apparatus according to claim 7, wherein the at least one processor is further configured to execute the instructions to determine the urgency of the event by using whether a target person includes a specific person.

9. An information processing method comprising, by an information processing apparatus:
generating feature information determining a moving body being present in a target area, and position information at that time, by processing an image, also generating movement history information, of the moving body, associating the feature information and the position information with time information, and storing the generated information in a related party database;
detecting occurrence of an event, by analyzing a sound being associated with position information and time information, and determining an occurrence location and a time of the event;
extracting feature information of a related moving body being at least one of the moving body being related to the event, and the moving body being present at a location from which the event is witnessable, by searching the related party database by using the determined occurrence location and time; and
generating a movement path of the related moving body, by processing an image including an image before and after an occurrence time of the event in a camera arranged around an occurrence location of the event, and analyzing a sound including a sound before and after the occurrence time of the event in a microphone arranged around the occurrence location of the event.

10. The information processing method according to claim 9, wherein the moving body includes at least one of a person and a vehicle.

11. The information processing method according to claim 10, further comprising, by the information processing apparatus, computing a movement velocity of the related moving body from the position information of the related moving body for each time, and determining a movement means of the related moving body from the computed movement velocity.

12. The information processing method according to claim 9, further comprising, by the information processing apparatus, using at least one of the image and the sound, when generating the movement history information.

13. The information processing method according to claim 9, further comprising, by the information processing apparatus, detecting the occurrence of the event by using a word or a sentence uttered by a person.

14. The information processing method according to claim 9, further comprising, by the information processing apparatus:
generating attribute information of the event by using sound information at the occurrence of the event; and
searching the related party database by further using the attribute information of the event as well.

15. The information processing method according to claim 14, wherein the attribute information of the event includes at least one of a type, magnitude, and urgency of the event.

16. The information processing method according to claim 15, further comprising, by the information processing apparatus, determining the urgency of the event by using whether a target person includes a specific person.

17. A non-transitory computer-readable storage medium storing a program causing a computer to execute:
a procedure of generating feature information determining a moving body being present in a target area, and position information at that time, by processing an image, also generating movement history information, of the moving body, associating the feature information and the position information with time information, and storing the generated information in a related party database;

a procedure of detecting occurrence of an event, by analyzing a sound being associated with position information and time information, and determining an occurrence location and a time of the event;

a procedure of extracting feature information of a related moving body being at least one of the moving body being related to the event, and the moving body being present at a location from which the event is witnessable, by searching the related party database by using the determined occurrence location and time; and a procedure of generating a movement path of the related moving body, by processing an image including an image before and after an occurrence time of the event in a camera arranged around an occurrence location of the event, and analyzing a sound including a sound before and after the occurrence time of the event in a microphone arranged around the occurrence location of the event.

18. The non-transitory computer-readable storage medium according to claim 17, wherein the moving body includes at least one of a person and a vehicle.

* * * * *